US012424775B2

(12) United States Patent
Yoshiura

(10) Patent No.: US 12,424,775 B2
(45) Date of Patent: Sep. 23, 2025

(54) ELECTRICAL CONNECTOR AND METHOD FOR MANUFACTURING ELECTRICAL CONNECTOR

(71) Applicant: SMK Corporation, Tokyo (JP)

(72) Inventor: Yasuo Yoshiura, Kanagawa (JP)

(73) Assignee: SMK Corporation, Tokyo (JP)

( * ) Notice: Subject to any disclaimer, the term of this patent is extended or adjusted under 35 U.S.C. 154(b) by 285 days.

(21) Appl. No.: 18/325,090

(22) Filed: May 29, 2023

(65) Prior Publication Data

US 2024/0006789 A1 Jan. 4, 2024

(30) Foreign Application Priority Data

Jun. 30, 2022 (JP) ................................ 2022-106385

(51) Int. Cl.
*H01R 13/516* (2006.01)
*H01R 12/70* (2011.01)
*H01R 43/18* (2006.01)

(52) U.S. Cl.
CPC ......... *H01R 12/707* (2013.01); *H01R 13/516* (2013.01); *H01R 43/18* (2013.01)

(58) Field of Classification Search
None
See application file for complete search history.

(56) References Cited

U.S. PATENT DOCUMENTS 5,288,248 A * 2/1994 Chen .................... H01R 13/658 439/108
5,718,605 A * 2/1998 Morikawa .......... H01R 12/7047 439/108
6,210,226 B1 * 4/2001 Zhu ........................ H01R 24/64 439/607.53

(Continued)

FOREIGN PATENT DOCUMENTS

EP 0654870 A2 5/1995
JP 3016857 U 10/1995

(Continued)

OTHER PUBLICATIONS

Office Action issued for related Japanese Application No. 2022-106384, issued by the Japanese Patent Office on Oct. 11, 2022 (drafted on Oct. 5, 2022).

(Continued)

*Primary Examiner* — Tho D Ta

(57) ABSTRACT

An electrical connector includes a case configured to be mounted on a mounting surface of a substrate, a receptacle configured to be mounted on the mounting surface as accommodated in the case, and a hold-down configured to be attached to the case. The case includes an accommodation part configured to accommodate the receptacle, and a front wall part, projecting wall parts and engagement parts configured to retain the receptacle in the accommodation part. The front wall part, projecting wall parts and engagement parts include elastically deformable engagement parts configured to retain the receptacle in the accommodation part (Continued)

with an elastic force. The hold-down includes a restriction part configured to restrict elastic deformation of the engagement parts in a direction of causing the receptacle to fall out of the accommodation part.

16 Claims, 15 Drawing Sheets

(56) References Cited

U.S. PATENT DOCUMENTS

| | | | | |
|---|---|---|---|---|
| 6,863,545 | B2 * | 3/2005 | Peloza | H01R 12/7005 439/931 |
| 9,882,303 | B1 | 1/2018 | Chalas | |
| 2003/0129864 | A1 | 7/2003 | Peloza | |
| 2015/0140858 | A1 | 5/2015 | Yoshiura | |
| 2021/0296828 | A1 | 9/2021 | Maesoba | |
| 2024/0006787 | A1 * | 1/2024 | Yoshiura | H01R 12/716 |
| 2024/0006830 | A1 * | 1/2024 | Yoshiura | H01R 12/58 |

FOREIGN PATENT DOCUMENTS

| | | | |
|---|---|---|---|
| JP | 2001196140 | A | 7/2001 |
| JP | 2005515588 | A | 5/2005 |
| JP | 2015103289 | A | 6/2015 |
| JP | 2016012420 | A | 1/2016 |
| JP | 2016018720 | A | 2/2016 |

OTHER PUBLICATIONS

Office Action issued for related U.S. Appl. No. 18/325,097, issued by the US Patent and Trademark Office on Jul. 1, 2025.

* cited by examiner

ELECTRICAL CONNECTOR AND METHOD FOR MANUFACTURING ELECTRICAL CONNECTOR

The contents of the following Japanese patent application(s) are incorporated herein by reference:

NO. 2022-106385 filed in JP on Jun. 30, 2022.

FIELD

The present invention relates to an electrical connector and a method for manufacturing the electrical connector.

BACKGROUND

Electrical connectors configured to retain a receptacle inside a case such as an outer housing have heretofore been known as an electrical connector for in-vehicle use and the like.

Patent Literature 1 discloses an electrical connector including a pair of U-shaped arm parts that sandwiches a receptacle with an elastic force, and locking parts that each have a locking surface parallel to a plane orthogonal to a direction of insertion of the receptacle and are disposed at the ends of the arm parts. The electrical connector disclosed in Patent Literature 1 also has pressing surfaces at corners formed by the locking surfaces and the arm parts. The pressing surfaces press the receptacle in the insertion direction when the arm parts sandwich the receptacle. The receptacle can thus be stably retained in the outer housing.

When the electrical connector disclosed in Patent Literature 1 sandwiches the receptacle with the pair of arm parts, the pair of arm parts is pressed by the receptacle, so that they are elastically deformed in directions away from each other and retract into retraction spaces. When parts of the receptacle to be locked pass the locking parts of the arm parts, the locking parts are engaged with the parts to be locked by elastic restoring force of the arm parts.

As electronic devices and the like, in which electrical connectors are mounted, are reduced in size, further miniaturization is demanded of electrical connectors in recent years.

CITATION LIST

Patent Literature

Patent Literature 1: Japanese Patent Application Laid-Open No. 2016-18720

SUMMARY

Technical Problem

However, according to Patent Literature 1, the contact areas between the parts to be locked of the receptacle and the locking parts of the arm parts decrease with the further miniaturization. In such a case, the electrical connector disclosed in Patent Literature 1 has the following problem. If a load such as an impact is applied to the electrical connector retaining the receptacle with the pair of arm parts, the application of the load can elastically deform the pair of arm parts in the directions away from each other. The locking parts of the arm parts and the parts to be locked of the receptacle can thereby be disengaged, and the receptacle can fall out of the case.

An object of the present invention is to provide an electrical connector that can prevent a receptacle from falling out of a case, and a method for manufacturing the electrical connector.

Solution to Problem

An electrical connector according to an aspect of the present invention includes a case configured to be mounted on a mounting surface of a substrate, a receptacle configured to be mounted on the mounting surface as accommodated in the case, and an attachment member configured to be attached to the case. The case includes an accommodation part configured to accommodate the receptacle, and a retaining part configured to retain the receptacle in the accommodation part. The retaining part includes an elastically deformable elastic part configured to retain the receptacle in the accommodation part with an elastic force. The attachment member includes a restriction part configured to restrict elastic deformation of the elastic part in a direction of causing the receptacle to fall out of the accommodation part.

A method for manufacturing an electrical connector according to an aspect of the present invention is a method for manufacturing an electrical connector including a case configured to be mounted on a mounting surface of a substrate, a receptacle configured to be mounted on the mounting surface as accommodated in the case, and an attachment member, the method including: a retaining step of accommodating the receptacle into the accommodation part of the case and retaining the receptacle accommodated in the accommodation part with a retaining part of the case; and an attachment step of attaching the attachment member to the case. The retaining step includes accommodating the receptacle into the accommodation part while elastically deforming an elastic part of the retaining part, and retaining the receptacle in the accommodation part with an elastic force of the elastic part; and restricting elastic deformation of the elastic part in a direction of causing the receptacle to fall out of the accommodation part by a restriction part of the attachment member attached to the case in the attachment step.

When the electrical connector undergoes an impact or the like that might elastically deform the elastic part in the direction of causing the receptacle to fall out of the accommodation part, the restriction part restricts the elastic deformation of the elastic part in the direction of causing the receptacle to fall out of the accommodation part.

According to the aspect(s) of the present invention, the receptacle can be prevented from falling out of the case.

DESCRIPTION OF EMBODIMENTS

Figure 1:
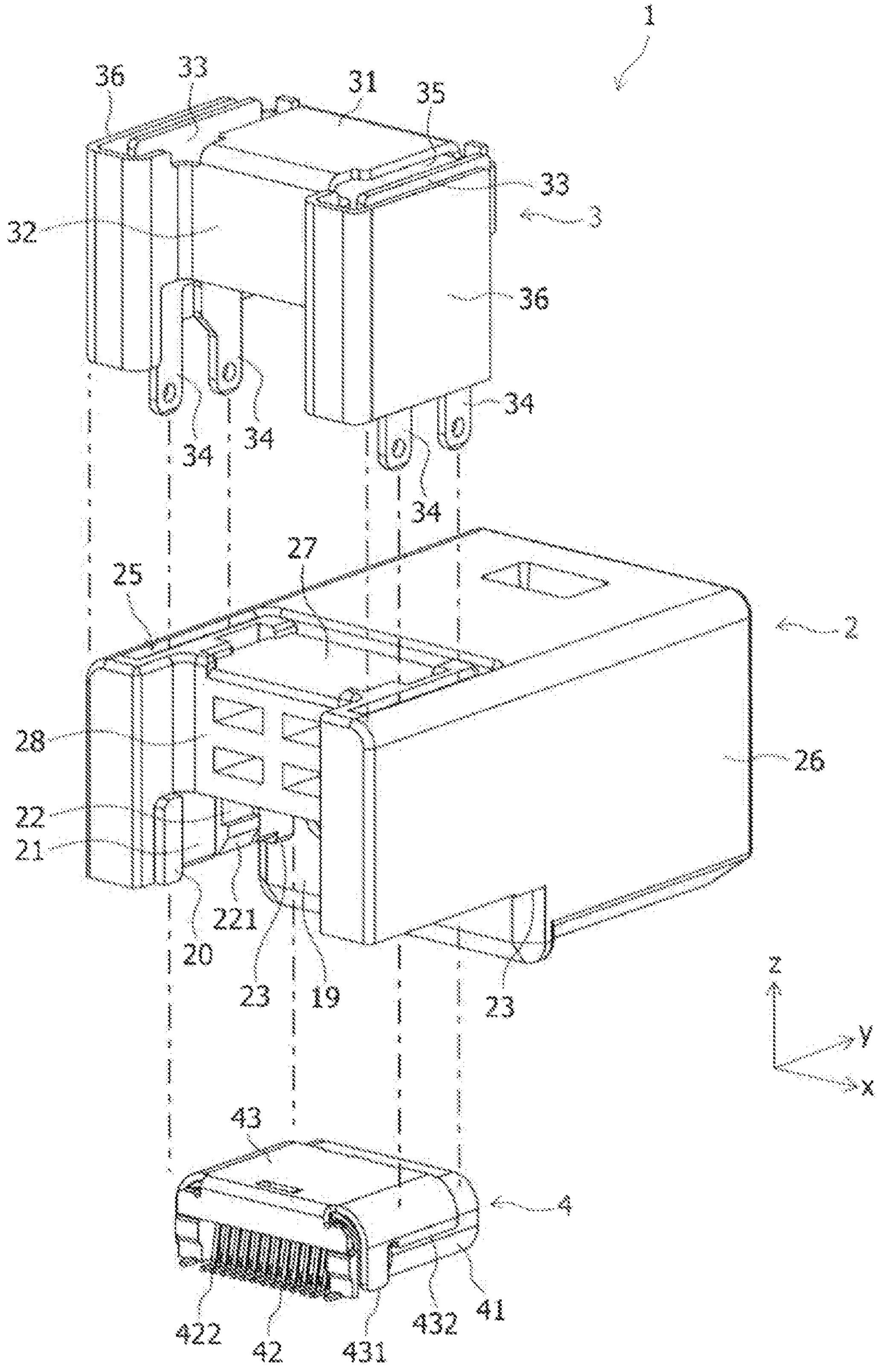
FIG. 1 is an exploded perspective view of an electrical connector according to a first embodiment of the present invention.
Figure 2:
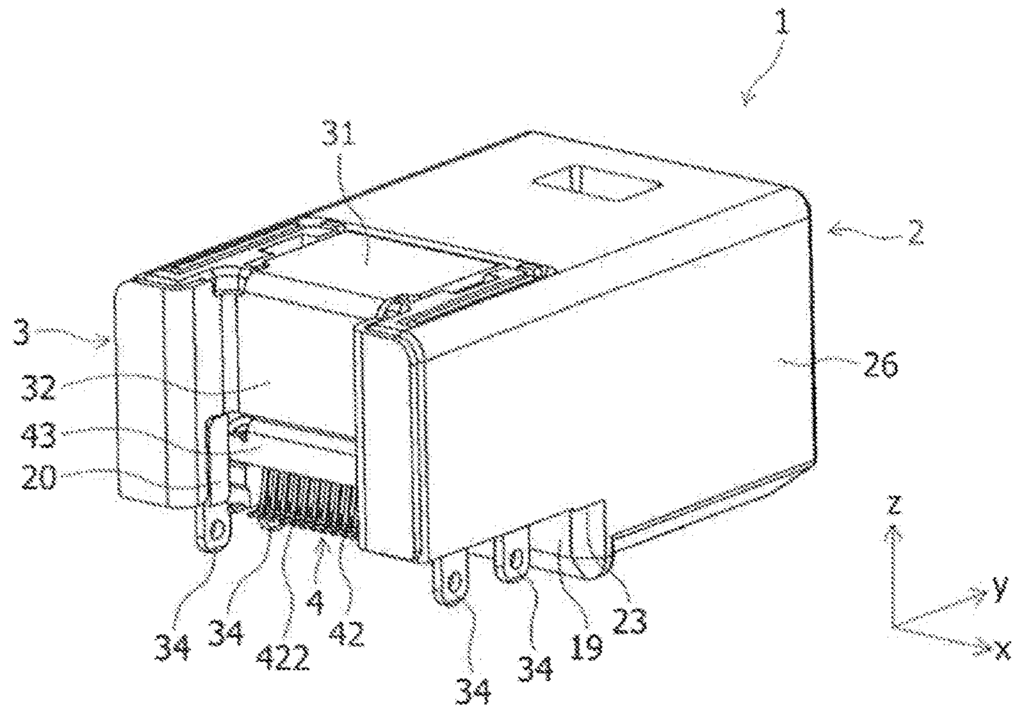
FIG. 2 is a perspective view of the electrical connector according to the first embodiment of the present invention, seen from behind and above.

Electrical connectors according to embodiments of the present invention will be described in detail below with reference to the drawings as appropriate. In the drawings, an x-axis, a y-axis, and a z-axis constitute a three-axis orthogonal coordinate system. A positive direction on the y-axis will be referred to as forward, a negative direction on the y-axis backward, a positive direction on the x-axis leftward, a negative direction on the x-axis rightward, a positive direction on the z-axis upward, and a negative direction on the z-axis downward.

First Embodiment

<Configuration of Electrical Connector>

A configuration of an electrical connector 1 according to a first embodiment of the present invention will be described in detail below with reference to FIGS. 1 to 14.

The electrical connector 1 according to the present embodiment includes a case 2, a hold-down 3, and a receptacle 4.

The case 2 is made of an insulating material such as a resin. The case 2 includes a pressing part 18, a front wall part 19, projecting wall parts 20, an accommodation part 21, engagement parts 22, contact parts 23, a mating part 24, an insertion part 25, a projecting part 26, a flat part 27, a rear wall part 28, an inner top wall part 29, and an opening 30. The front wall part 19, the projecting wall parts 20, and the engagement parts 22 constitute a retaining part that restricts forward, backward, leftward, rightward, and downward movement of the receptacle 4 accommodated in the accommodation part 21 to retain the receptacle 4 in the accommodation part 21.

Figure 5:
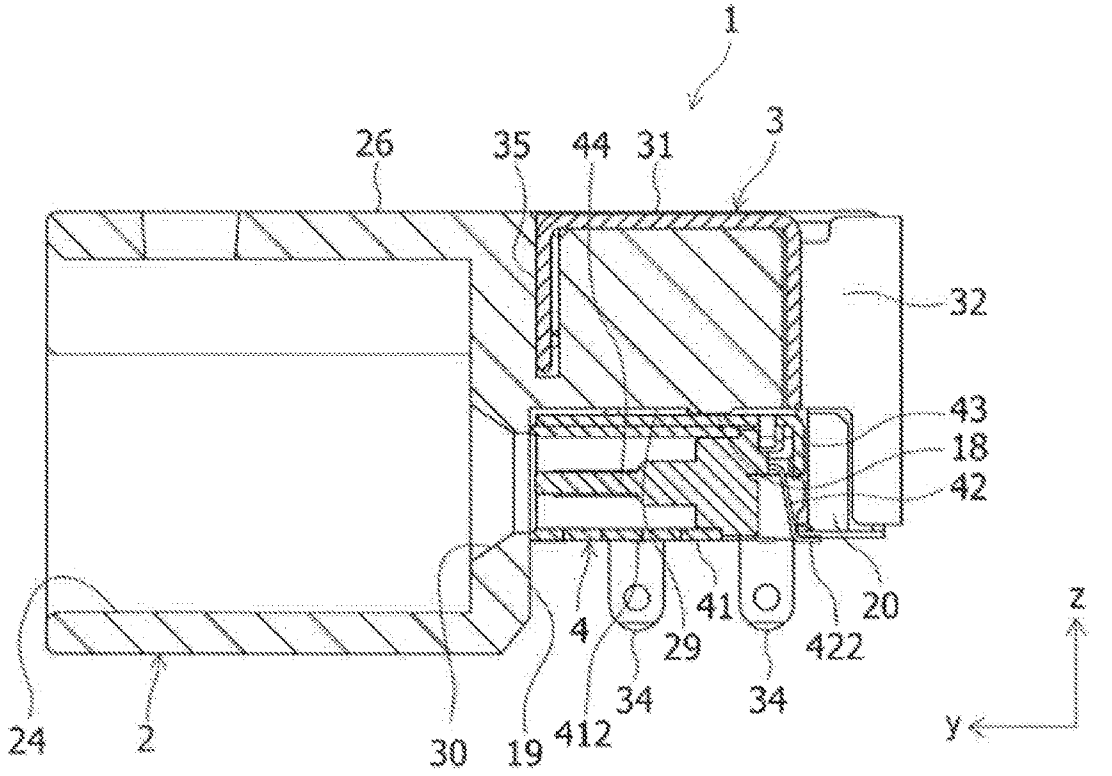
FIG. 5 is a cross-sectional view taken along the line A-A of FIG. 4.
Figure 6:
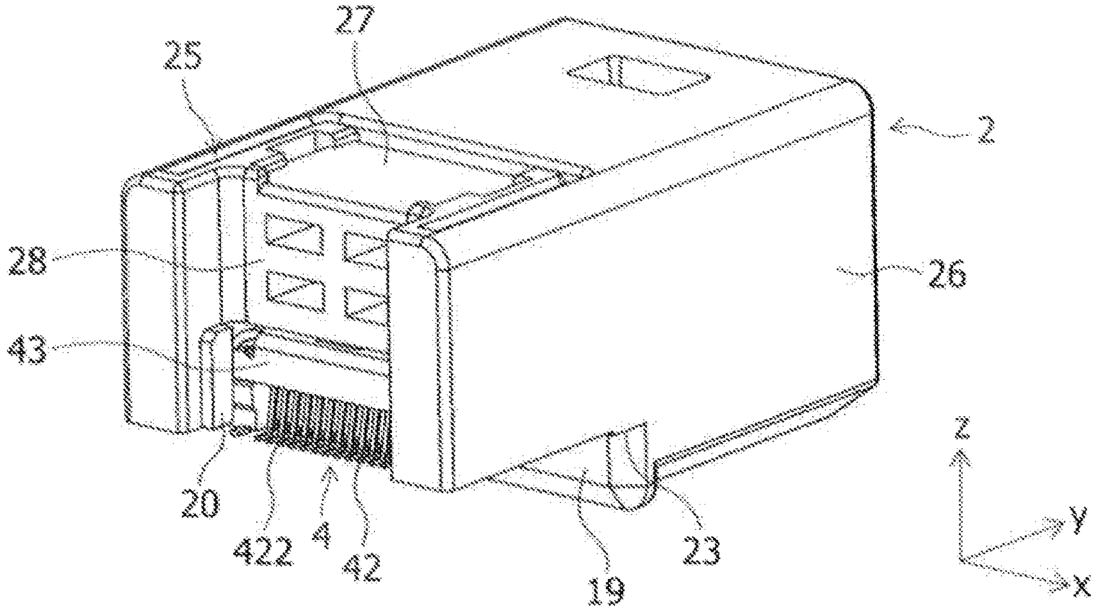
FIG. 6 is a perspective view of the electrical connector according to the first embodiment of the present invention with a hold-down removed.

As shown in FIG. 5, the pressing part 18 projects below the inner top wall part 29 between projecting parts 412 and terminal parts 422, to be described below, of the receptacle 4. The pressing part 18 is disposed opposite to the receptacle 4 retained in the accommodation part 21 with a gap therebetween. The pressing part 18 is designed to make contact with the receptacle 4 when the case 2 and the receptacle 4 are mounted on a mounting surface 100*a* of a substrate 100.

The front wall part 19 is located in front of the accommodation part 21, and restricts the forward movement of the receptacle 4 retained in the accommodation part 21.

The projecting wall parts 20 are located behind the engagement parts 22, and restrict the backward movement of the receptacle 4 accommodated in the accommodation part 21.

The accommodation part 21 is located at a lower surface or a bottom surface of the case 2 to be opposed to the mounting surface 100*a* of the substrate 100. The accommodation part 21 communicates with outside at its rear end. The accommodation part 21 accommodates the receptacle 4 so that the receptacle 4 is exposed outside.

A pair of engagement parts 22 serving as elastic parts is disposed on the left and right inner walls of the accommodation part 21. Each engagement part 22 has a locking claw part 221 projecting inward at its lower end. The engagement parts 22 are elastically deformable in a lateral direction between the insertion part 25 and the accommodation part 21. With the locking claw parts 221 engaged with parts to be engaged 432 of a cover 43, to be described below, of the receptacle 4, the engagement parts 22 restrict the downward movement of the receptacle 4.

The contact parts 23 are located at the lower ends of the left and right side walls of the accommodation part 21 at the front end. The contact parts 23 make contact with the mounting surface 100*a* of the substrate 100 when the case 2 is mounted on the mounting surface 100*a*.

The mating part 24 is disposed in the projecting part 26, and has a cylindrical shape open to the outside at the front end. The mating part 24 can be mated with a not-shown counterpart connector.

The insertion part 25 is a penetration hole vertically penetrating the case 2 around the accommodation part 21. The hold-down 3 is inserted through the insertion part 25.

Figure 7:
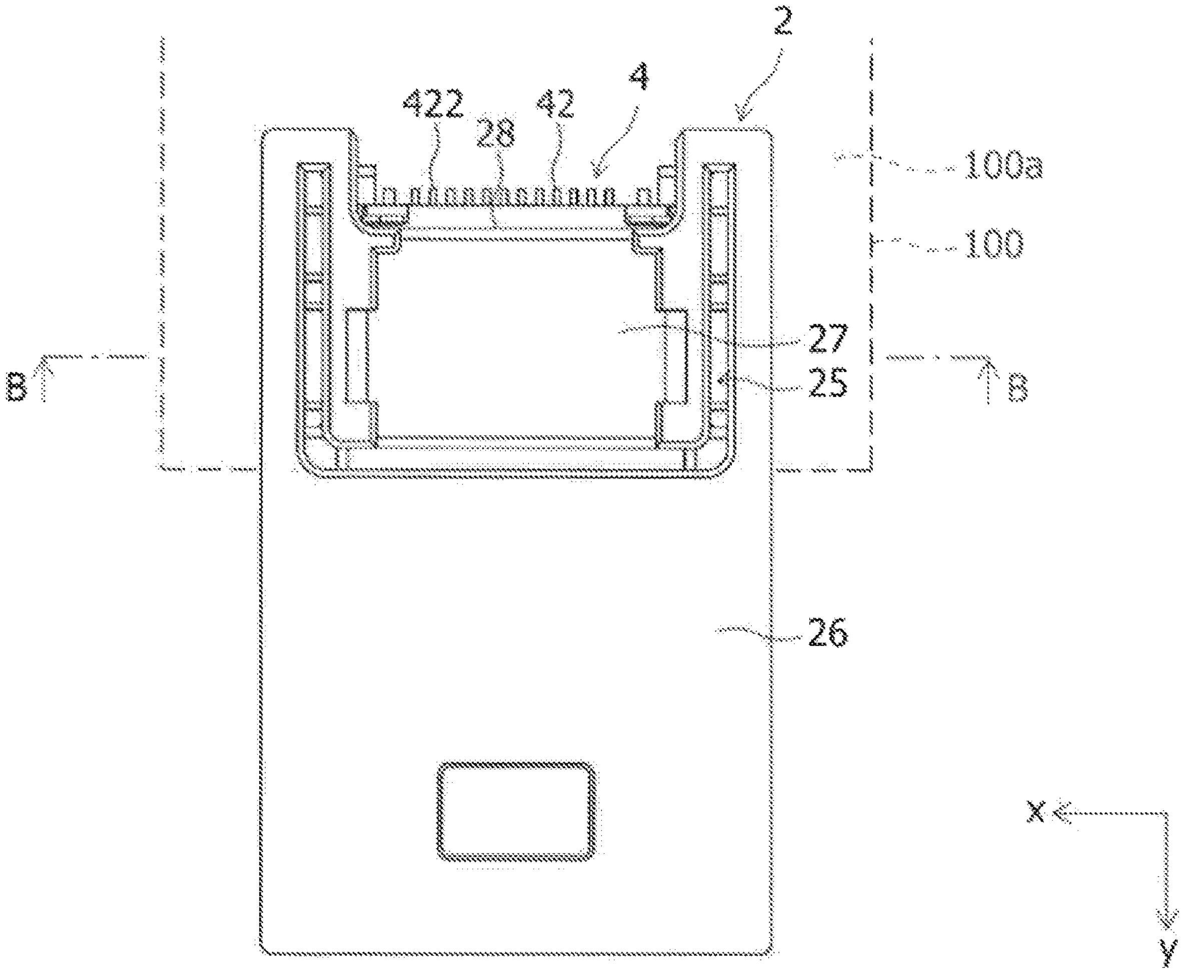
FIG. 7 is a plan view of the electrical connector according to the first embodiment of the present invention in a state where the electrical connector is mounted on a substrate with the hold-down removed.
Figure 8:
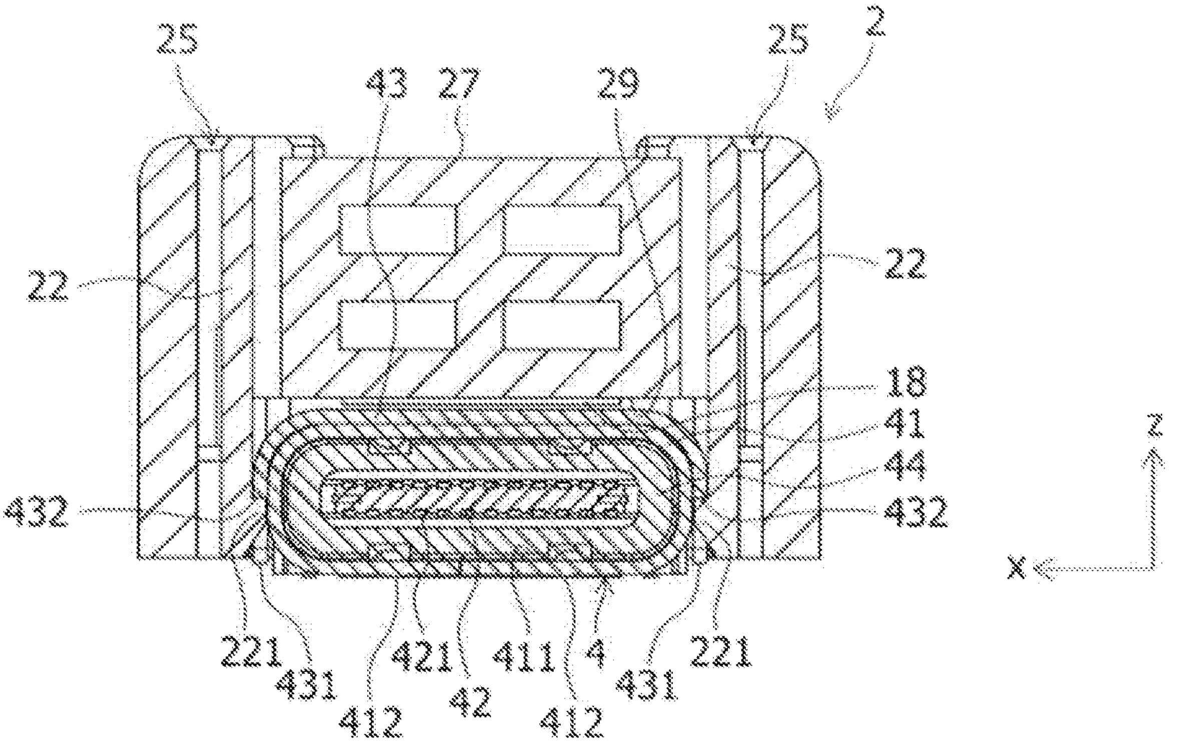
FIG. 8 is a cross-sectional view taken along the line B-B of FIG. 7.
Figure 9:
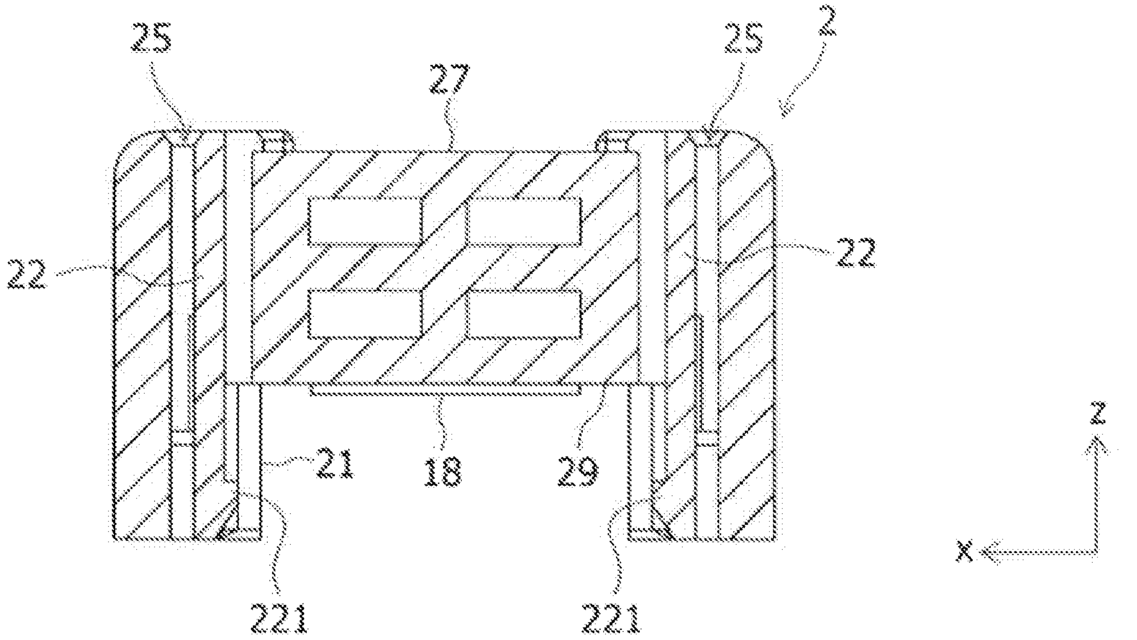
FIG. 9 is a cross-sectional view of a case of the electrical connector according to the first embodiment of the present invention.
Figure 10:
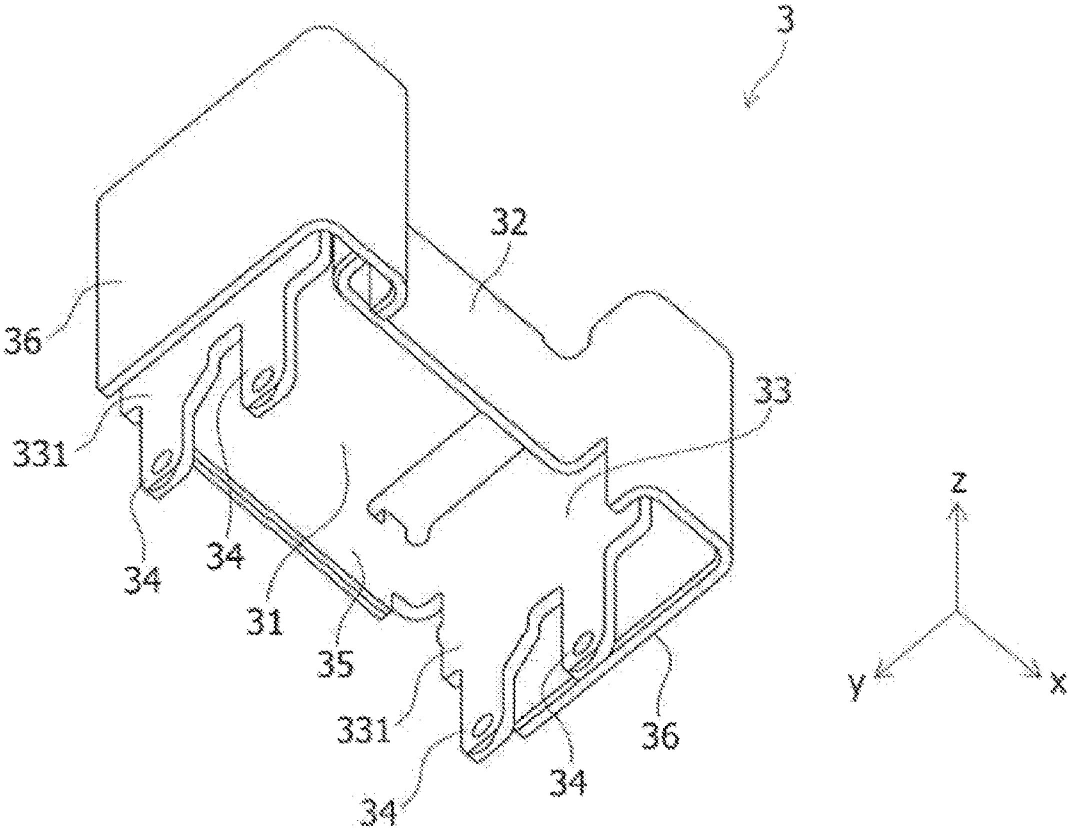
FIG. 10 is a perspective view of the hold-down of the electrical connector according to the first embodiment of the present invention, seen from rear right and below.
Figure 11:
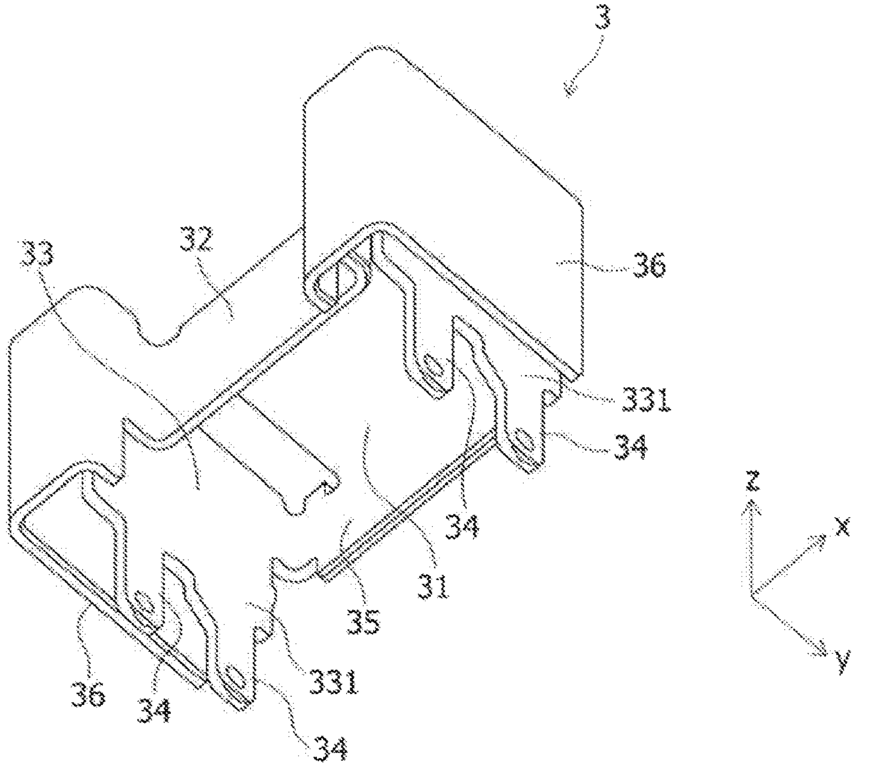
FIG. 11 is a perspective view of the hold-down of the electrical connector according to the first embodiment of the present invention, seen from rear left and below.
Figure 12:
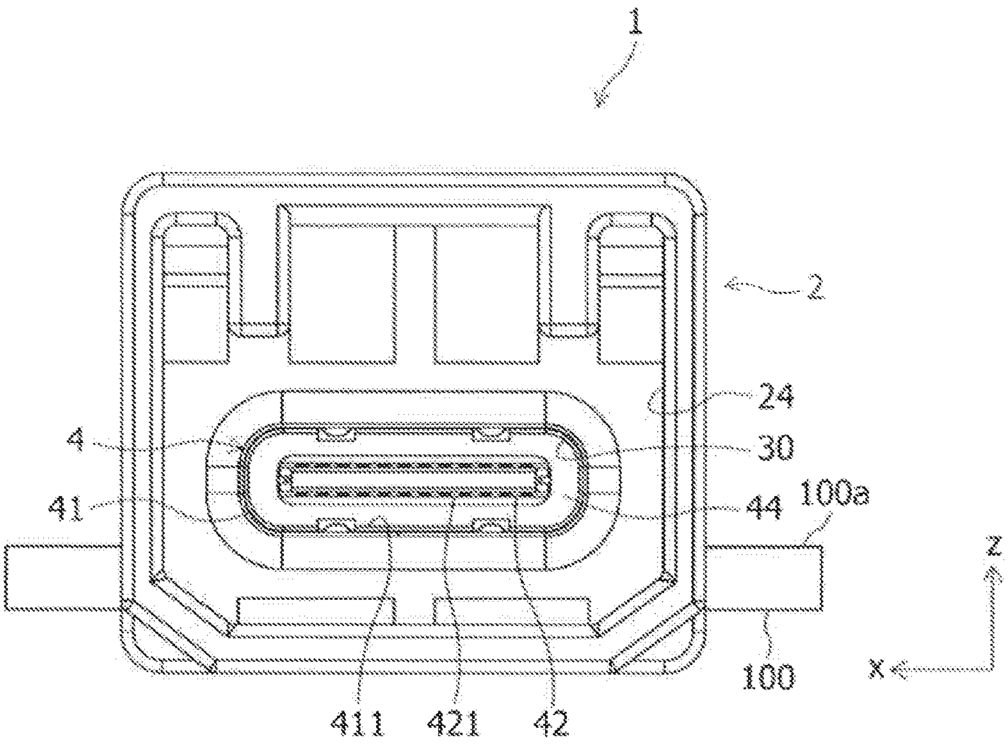
FIG. 12 is a front view of the electrical connector according to the first embodiment of the present invention in a state where the electrical connector is mounted on the substrate.
Figure 13:
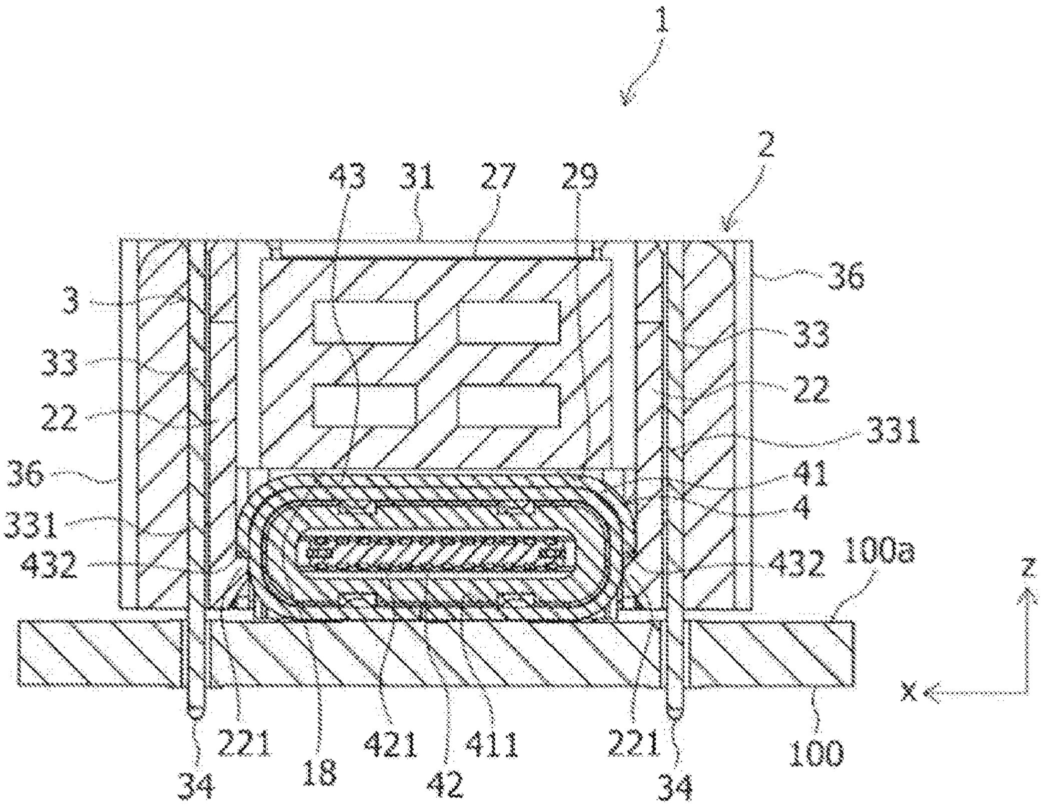
FIG. 13 is a cross-sectional view of the electrical connector according to the first embodiment of the present invention in the state where the electrical connector is mounted on the substrate.

The projecting part 26 projects forward from the substrate 100 when the case 2 is mounted on the mounting surface 100*a* of the substrate 100 (see FIG. 7).

The flat part 27 is located at the rear upper surface of the case 2. The flat part 27 is flat along the front-to-back and left-to-right directions.

The rear wall part 28 is located at the rear end of the case 2. The rear wall part 28 is recessed forward in the lateral center.

The inner top wall part 29 is located above the accommodation part 21.

The opening 30 is formed in the front wall part 19. The accommodation part 21 and the mating part 24 communicate through the opening 30 (see FIG. 5).

The hold-down 3 is an attachment member formed by punching out a metal plate by press-working and bending the punched metal plate, and is attached to the case 2 to fix the case 2 to the substrate 100. The hold-down 3 is inserted through the insertion part 25 of the case 2 and thereby attached to the case 2. The hold-down 3 includes a top surface part 31, a rear surface part 32, internal side surface parts 33, leg parts 34, a front surface part 35, and external side surface parts 36.

The top surface part 31 covers the flat part 27.

The rear surface part 32 is formed by bending the metal plate down at the rear end of the top surface part 31. The rear surface part 32 covers the rear wall part 28.

The internal side surface parts 33 are formed by bending the metal plate backward at the left and right ends of the front surface part 35, and located on the left and right of the top surface part 31. The internal side surface parts 33 are inserted into the insertion part 25. Each of the internal side surface parts 33 includes a restriction part 331 above and near the front one of a pair of leg parts 34.

The restriction parts 331 are located laterally outside the locking claw parts 221 and opposed to the locking claw parts 221. The restriction parts 331 restrict laterally outward elastic deformation of the engagement parts 22 that causes the receptacle 4 to fall out of the accommodation part 21. Meanwhile, the restriction parts 331 allow laterally outward elastic deformation of the engagement parts 22 so far as the receptacle 4 does not fall out of the accommodation part 21. Here, laterally outward refers to directions that cause the receptacle 4 to fall out of the accommodation part 21.

The leg parts 34 serving as soldering parts are extended downward from the respective lower ends of the left and right internal side surface parts 33. Each internal side surface part 33 has a pair of leg parts 34 spaced in the front-to-back direction. The leg parts 34 project below the insertion part 25 and are located above the bottom surface of the case 2.

The front surface part 35 is formed by bending the metal plate down at the front end of the top surface part 31. The front surface part 35 is inserted into the insertion part 25.

The external side surface parts 36 are formed by bending the metal plate forward at the left and right ends of the rear surface part 32. The external side surface parts 36 cover the rear end sides of the left and right side surface parts of the case 2.

The receptacle 4 includes a shield case 41, contacts 42, the cover 43, and a housing 44.

The shield case 41 is formed by punching out a metal plate by press-working and bending the punched metal plate, and includes a mating part 411 that opens forward and mates with the not-shown counterpart connector. The shield case 41 includes projecting parts 412 that project below the bottom surface. The projecting parts 412 make contact with and are soldered to the mounting surface 100*a* of the substrate 100 when the receptacle 4 is mounted on the mounting surface 100*a*.

Figure 3:
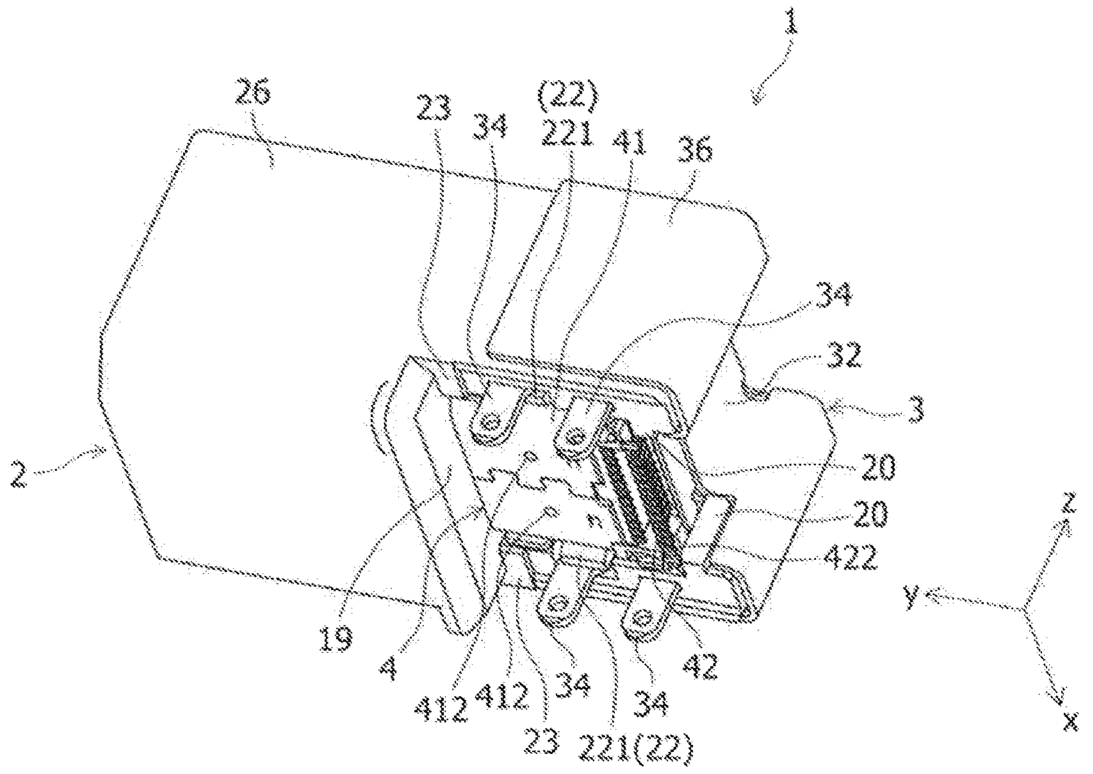
FIG. 3 is a perspective view of the electrical connector according to the first embodiment of the present invention, seen from behind and below.
Figure 4:
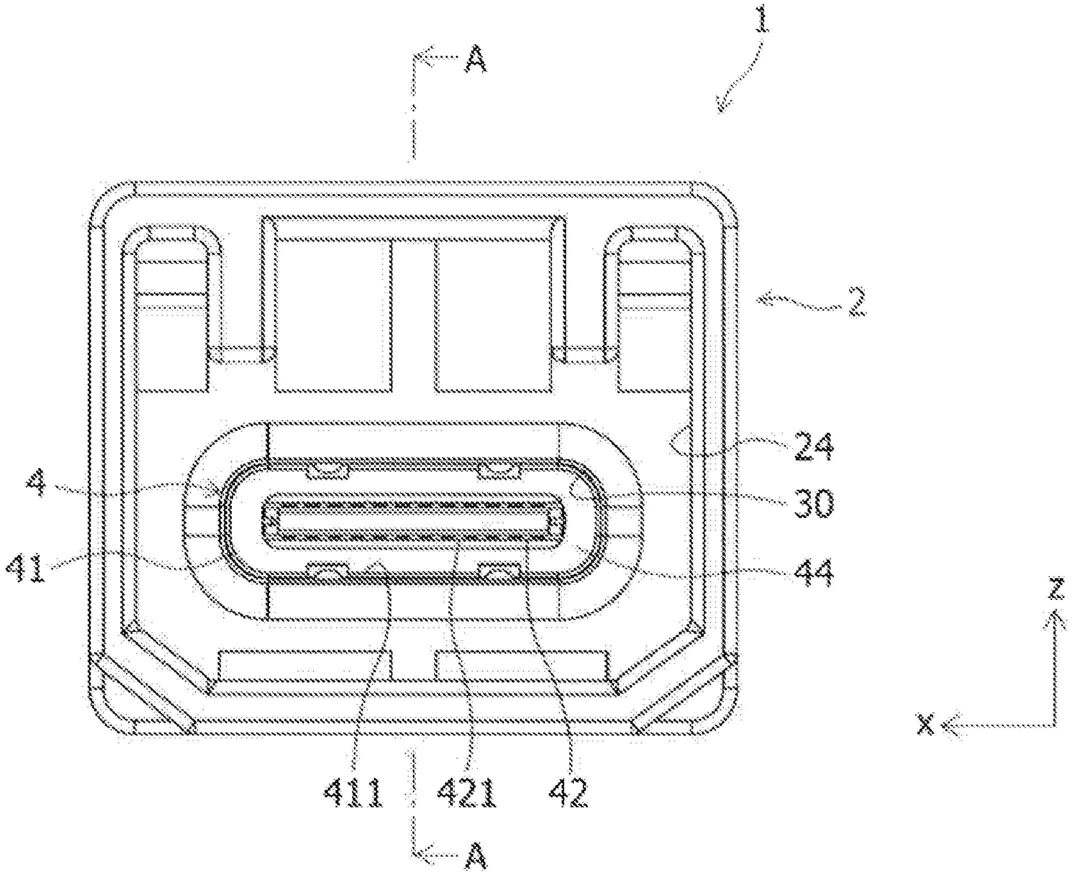
FIG. 4 is a front view of the electrical connector according to the first embodiment of the present invention.

As shown in FIG. 3, a pair of projecting parts 412 is disposed between the terminal parts 422 and the contact parts 23, on the left and right of a seam of the bent metal plate constituting the shield case 41. While the projecting parts 412 are soldered to the mounting surface 100*a*, the projecting parts 412 are not limited thereto and may simply be put into contact with the mounting surface 100*a* without soldering.

The contacts 42 are made of a conductive material and attached to the housing 44. The contacts 42 include connection parts 421 for connecting to conductive parts of the not-shown counterpart connector, and terminal parts 422 to be soldered to the mounting surface 100*a* of the substrate 100. The terminal parts 422 are located below the contact parts 23 in a state where the locking claw parts 221 of the engagement parts 22 and the parts to be engaged 432 of the cover 43 are engaged to retain the receptacle 4 in the accommodation part 21 (see FIG. 14).

The cover 43 is formed by punching out a metal plate by press-working and bending the punched metal plate, and attached to the shield case 41 as insulated from the contacts 42. The cover 43 includes leg parts 431 to be connected to not-shown conductive parts of the mounting surface 100*a* of the substrate 100, and the parts to be engaged 432 to be engaged with the locking claw parts 221 of the engagement parts 22. The parts to be engaged 432 are cut sections which have the same width as the thickness of the metal plate constituting the cover 43.

The housing 44 is made of an insulating material such as a resin, and covered with the shield case 41. The housing 44 retains the contacts 44 so that the contacts 42 are insulated from the shield case 41 and the cover 43.

When retained in the accommodation part 21, the receptacle 4 with the foregoing configuration is disposed opposite to the pressing part 18 of the case 2 at a distance and can thus move up relative to the case 2.

<Method for Manufacturing Electrical Connector>

A method for manufacturing the electrical connector 1 according to the first embodiment of the present invention will be described in detail below with reference to FIGS. 1 to 13.

Initially, the case 2 is formed by injection molding or the like using a resin material in advance, and the hold-down 3 is formed by press-working a metal plate. Moreover, the receptacle 4 manufactured by an existing method is prepared. Here, a receptacle 4 including terminal parts 422, the amount or pitch of which corresponds to the use purpose, can be selected.

Next, an insertion step of inserting the receptacle 4 into the accommodation part 21 of the case 2 from in front of and below the projecting wall parts 20 is performed. Here, the receptacle 4 is inserted into the accommodation part 21 while elastically deforming the engagement parts 22 of the case 2 laterally outward with the cover 43 of the receptacle 4.

Next, a retaining step is performed. In this retaining step, the receptacle 4 is inserted into the accommodation part 21 from below until the parts to be engaged 432 of the cover 43 of the receptacle 4 pass through the locking claw parts 221 of the engagement parts 22. The locking claw parts 221 of the engagement parts 22 and the parts to be engaged 432 of the cover 43 are thus engaged by the elastic restoring force of the engagement parts 22 of the case 2, whereby the receptacle 4 is retained in the accommodation part 21. Here, the receptacle 4 is retained in the accommodation part 21 with its downward movement restricted by the locking claw parts 221 of the engagement parts 22, its backward movement restricted by the projecting wall parts 20, and its forward movement restricted by the front wall part 19.

Next, the leg parts 34 of the hold-down 3 are inserted into the insertion part 25 of the case 2 from above, and the internal side surface parts 33 and the front surface part 35 are then inserted.

The internal side surface parts 33 and the front surface part 35 of the hold-down 3 are then further inserted into the insertion part 25, whereby the top surface part 31 is brought into contact with the flat part 27 to cover the flat part 27. The rear surface part 32 covers the rear wall part 28, and the external side surface parts 36 cover the rear end sides of the left and right side surface parts of the case 2. The electrical connector 1 is thereby completed.

With the electrical connector 1 completed, the laterally outward elastic deformation of the engagement parts 22 are restricted by the restriction parts 331 of the internal side surface parts 33. This can prevent the receptacle 4 from falling out of the accommodation part 21 before the electrical connector 1 is mounted on the mounting surface 100*a* of the substrate 100.

Note that the engagement between the locking claw parts 221 and the parts to be engaged 432 is extremely shallow since the parts to be engaged 432 to be engaged with the locking claw parts 221 have an engaging width only as much as the thickness of the metal plate constituting the cover 43. If the laterally outward elastic deformation of the engagement parts 22 is not restricted by the restriction parts 331, the locking claw parts 221 and the parts to be engaged 432 are therefore likely to be disengaged and the receptacle 4 to fall out of the case 2 when the electrical connector 1 undergoes an external force such as an impact before the electrical connector 1 is mounted on the substrate 100.

By contrast, according to the present embodiment, the restriction parts 331 of the hold-down 3 restrict the laterally outward elastic deformation of the engagement parts 22. This can prevent the receptacle 4 from falling out of the case 2 due to the laterally outward elastic deformation of the engagement parts 22 when the electrical connector 1 undergoes an external force such as an impact, despite the extremely shallow engagement between the locking claw parts 221 and the parts to be engaged 432.

<Method for Mounting Electrical Connector>

A method for mounting the electrical connector 1 according to the first embodiment of the present invention will be described in detail below with reference to FIGS. 1 to 15.

Figure 14:
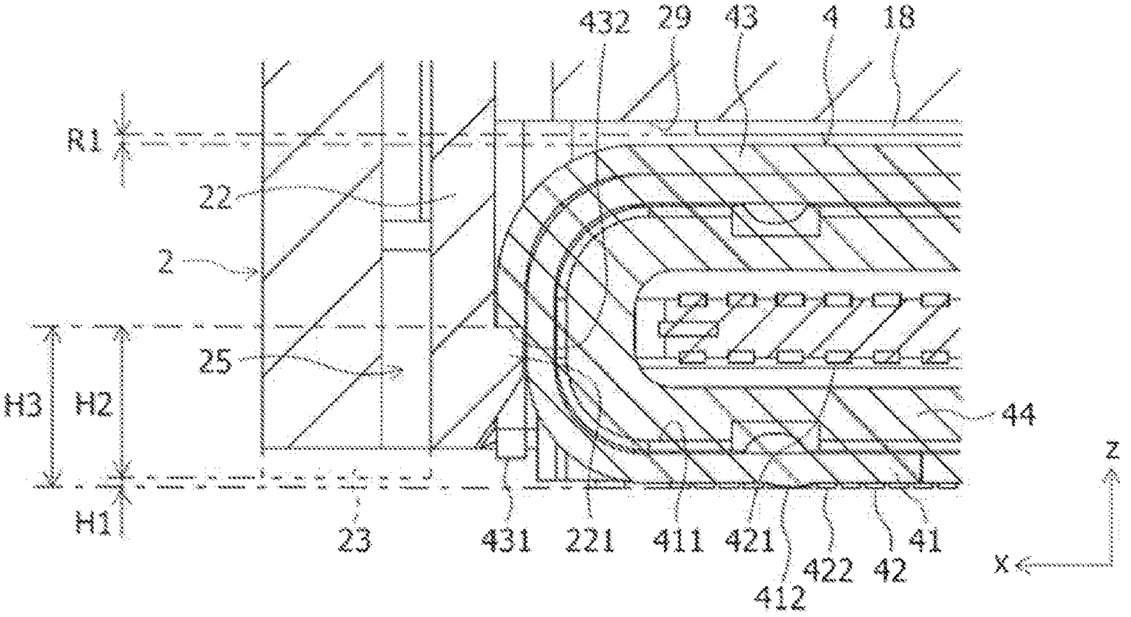
FIG. 14 is an enlarged cross-sectional view of a part of the electrical connector according to the first embodiment of the present invention before the electrical connector is mounted on the substrate.

The top surface part 31 of the electrical connector 1 manufactured by the foregoing manufacturing method is sucked to a suction nozzle of a not-shown mounter, and the electrical connector 1 is transported to the mounting surface 100*a* of the substrate 100. Here, as shown in FIG. 14, the locking claw parts 221 of the engagement parts 22 and the parts to be engaged 432 of the cover 43 are engaged with each other, whereby the terminal parts 422 of the receptacle 4 are located a distance H1 below the contact parts 23 of the case 2. The receptacle 4 is disposed opposite to the pressing part 18 projecting below the inner top wall part 29 of the case 2 at a distance R1.

Next, the leg parts 34 of the hold-down 3 of the electrical connector 1 are inserted into through holes 100*b* of the substrate 100 from above.

As the leg parts 34 are inserted into the through holes 100*b*, the terminal parts 422 of the contacts 42 of the receptacle 4 and the projecting parts 412 of the shield case 41 initially make contact with the mounting surface 100*a*. The contact parts 23 of the case 2 then make contact with the mounting surface 100*a*.

As shown in FIG. 14, before the terminal parts 422 and the projecting parts 412 come in contact with the mounting surface 100*a*, a vertical distance H2 between the lower end parts of the contact parts 23 and the upper end parts of the locking claw parts 221 is smaller than a vertical distance H3 between the lower end parts of the parts to be engaged 432 of the receptacle 4 and the soldering surfaces of the terminal parts 422 (H2<H3). The soldering surfaces of the terminal parts 422 and the lower end parts of the projecting parts 412 are located H1 below the lower end parts of the contact parts 23. When the terminal parts 422 and the projecting parts 412 come into contact with the mounting surface 100*a* in such a condition, the parts to be engaged 432 move up relative to the locking claw parts 221 and are thereby separated from the locking claw parts 221. The receptacle 4 moves up relative to the case 2 by the distance H1 (=H3−H2) inside the accommodation part 21. This frees the receptacle 4 from the case 2.

Figure 15:
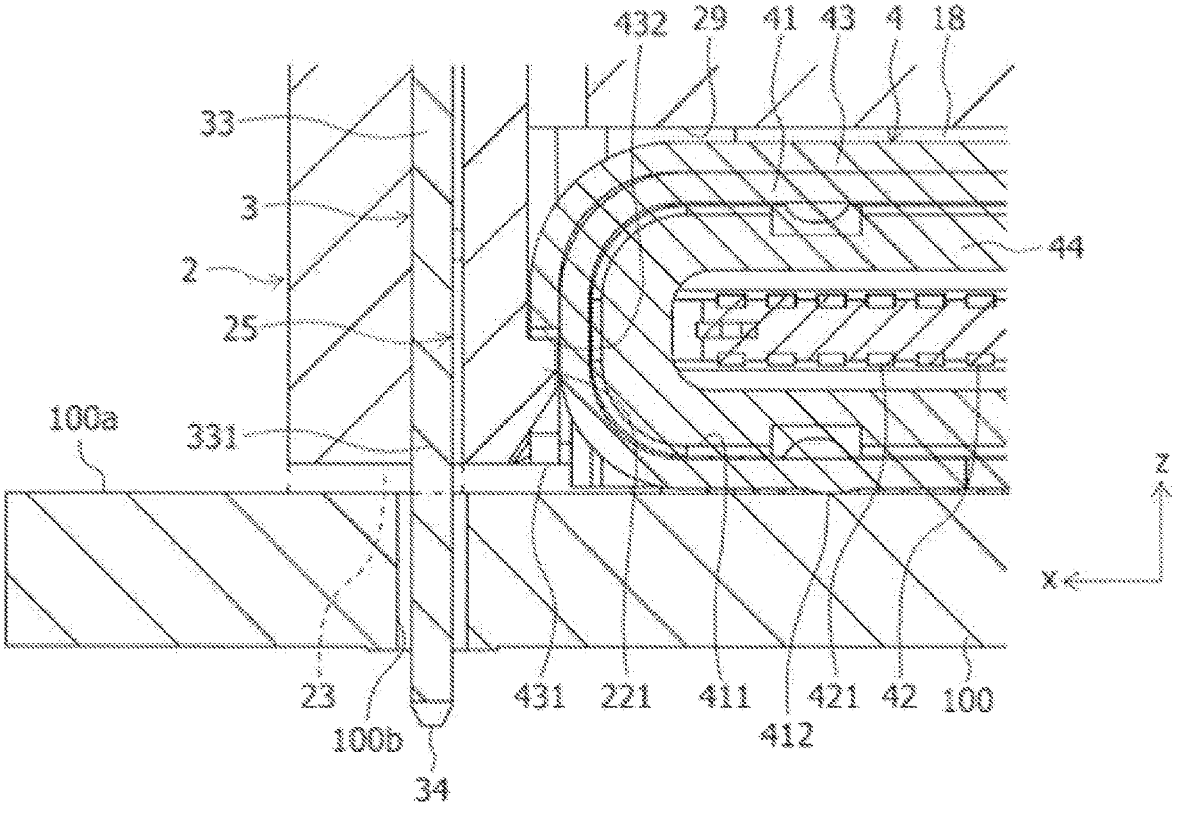
FIG. 15 is an enlarged cross-sectional view of a part of the electrical connector according to the first embodiment of the present invention after the electrical connector is mounted on the substrate.

As shown in FIG. 15, since the receptacle 4 moves up relative to the case 2, the soldering surfaces of the terminal parts 422 and the lower end parts of the contact parts 23 located at substantially the same positions (H1≅0). Since the distance R1 is substantially the same as the distance H1 (R1≅H1), the upward movement relative to the case 2 brings the receptacle 4 into contact with the pressing part 18 (R1=0), and the receptacle 4 is pressed toward the mounting surface 100*a* from above by the pressing part 18.

Before the electrical connector 1 is mounted on the substrate 100, the soldering surfaces of the terminal parts 422 of the receptacle 4 are located below the lower end parts of the contact parts 23 of the case 2. However, this is not restrictive, and the soldering surfaces of the terminal parts 422 and the lower end parts of the contact parts 23 may be vertically located at the same height (H1=0 and H2=H3). In such a case, the locking claw parts 221 and the parts to be engaged 432 may not be fully separated after contact of the terminal parts 422 and the projecting parts 412 with the substrate 100. However, the receptacle 4 can be similarly freed from the case 2 if the weight of the receptacle 4 itself does not act on the locking claw parts 221 via the parts to be engaged 432.

Moreover, the restriction parts 331 of the hold-down 3 allow the laterally outward elastic deformation of the engagement parts 22 so far as the receptacle 4 does not fall out of the accommodation part 21. The positions of the terminal parts 422 can thus be laterally adjusted to the soldering positions on the mounting surface 100*a* for a reliable contact.

Next, the terminal parts 422 and the projecting parts 412 of the receptacle 4 are soldered to not-shown conductive parts of the mounting surface 100*a* of the substrate 100, and the leg parts 34 of the hold-down 3 are soldered to not-shown conductive parts of the through holes 100*b* of the substrate 100. The mounting of the electrical connector 1 on the substrate 100 is thereby completed. As described above, the parts to be engaged 432 of the receptacle 4 here are disengaged from the locking claw parts 221. The coplanarity of the terminal parts 422 to the mounting surface 100*a* of the substrate 100 can thus be maintained in a favorable state without being affected by the case 2.

Since the receptacle 4 is pressed against the mounting surface 100*a* from above by the pressing part 18, the terminal parts 422 and the projecting parts 412 can be prevented from being separated from the mounting surface 100*a*. Here, the receptacle 4 is pressed against the mounting surface 100*a* from above by the pressing part 18 in between the terminal parts 422 in contact with the mounting surface 100*a* and the projecting parts 412 in contact with the mounting surface 100*a*. The receptacle 4 can thus be mounted in parallel to the mounting surface 100*a* without a tilt in the front-to-back direction.

As shown in FIG. 7, the projecting part 26 of the case 2 of the electrical connector 1 mounted on the substrate 100 by the foregoing mounting method projects from the substrate 100. In such a state, the barycentric position of the electrical connector 1 overlaps the substrate 100 when seen from above (in the state shown in FIG. 7) because of the provision of the hold-down 3. The electrical connector 1 can thus be stably mounted on the substrate 100.

The restriction parts 331 are disposed above the leg parts 34 to be soldered to the conductive parts of the through holes 100*b*. The laterally outward elastic deformation of the engagement parts 22 can thus be reliably restricted by the restriction parts 331 even if the restriction parts 331 are pressed laterally outward by the engagement parts 22 in the state where the electrical connector 1 is mounted on the mounting surface 100*a* of the substrate 100.

As described above, according to the present embodiment, the electrical connector 1 includes the case 2 and the receptacle 4 to be mounted on the mounting surface 100*a* of the substrate 100. The case 2 includes: the accommodation part 21 that is disposed in the bottom surface to be opposed to the mounting surface 100*a* and accommodates the receptacle 4 in a state of being exposed outside; the front wall part 19, the projecting wall parts 20, and the engagement parts 22 that retain the receptacle 4 in the accommodation part 21; and the contact parts 23 that make contact with the mounting surface 100*a*. The receptacle 4 includes the terminal parts 422 to be soldered to the mounting surface 100*a*. In the state where the receptacle 4 is retained in the accommodation part 21 by the front wall part 19, the projecting wall parts 20, and the engagement parts 22, the terminal parts 422 are located at the same height as the contact parts 23 or below the contact parts 23, and can move up. The coplanarity of the terminal parts 422 of the receptacle 4 can thus be maintained in a favorable state even if the terminal parts 422 of the receptacle 4 have a narrow pitch.

According to the present embodiment, the electrical connector 1 includes the case 2 to be mounted on the mounting surface 100*a* of the substrate 100, the receptacle 4 to be mounted on the mounting surface 100*a* as accommodated in the case 2, and the hold-down 3 that is attached to the case 2. The case 2 includes the accommodation part 21 that accommodates the receptacle 4, and the front wall part 19, the projecting wall parts 20, and the engagement parts 22 that retain the receptacle 4 in the accommodation part 21. The retaining part includes the elastically deformable engagement parts 22 that retain the receptacle 4 in the accommodation part 21 with an elastic force. The hold-down 3 includes the restriction parts 331 that restricts elastic deformation of the engagement parts 22 in the direction of causing the receptacle 4 to fall out of the accommodation part 21. The receptacle 4 can thereby be prevented from falling out of the case 2.

According to the present embodiment, the hold-down 3 that fixes the case 2 to the substrate 100 restricts the elastic deformation of the engagement parts 22 in the direction of causing the receptacle 4 to fall out of the accommodation part 21. The hold-down 3 can thus serve both as a member for fixing the case 2 to the substrate 100 and as a member for restricting the elastic deformation of the engagement parts 22 in the direction of causing the receptacle 4 to fall out of the accommodation part 21. This can prevent an increase in the number of components.

In the present embodiment, the elastic deformation of the engagement parts 22 in the direction of causing the receptacle 4 to fall out of the accommodation part 21 is restricted by the hold-down 3. However, this is not restrictive. An attachment member other than the hold-down 3 may be attached to the case 2, and the elastic deformation of the engagement parts 22 in the direction of causing the receptacle 4 to fall out of the accommodation part 21 may be restricted by the attachment member.

Second Embodiment

<Configuration of Electrical Connector>

A configuration of an electrical connector 11 according to a second embodiment of the present invention will be described in detail below with reference to FIGS. 16 to 19.

In FIGS. 16 to 19, portions having the same configurations as in FIGS. 1 to 15 are denoted by the same reference numerals. A description thereof will be omitted.

The electrical connector 11 according to the present embodiment includes a receptacle 4, a case 5, and a hold-down 6.

The case 5 is made of an insulating material such as a resin. The case 5 includes a front wall part 19, projecting wall parts 20, an accommodation part 21, engagement parts 22, contact parts 23, a mating part 24, an insertion part 25, a projecting part 26, an inner top wall part 29, an opening 30, spring parts 51, a movable part 52, and a rear wall part 53. The spring parts 51 and the movable part 52 constitute a pressure spring part.

The accommodation part 21 is a recess formed in the lower surface or bottom surface of the case 5. The accommodation part 21 communicates with outside at the rear end.

The insertion part 25 is a penetration hole vertically penetrating the case 5 around the accommodation part 21. The hold-down 6 is inserted through the insertion part 25.

The projecting part 26 projects forward from a substrate 100 when the case 5 is mounted on a mounting surface 100*a* of the substrate 100.

The inner top wall part 29 is located above the accommodation part 21 and opposed to the receptacle 4 retained in the accommodation part 21 at a distance.

The spring parts 51 connect the movable part 52 and the rear wall part 53. The spring parts 51 are elastically deformed to allow downward movement of the movable part 52 when the movable part 52 is pressed down. The spring parts 52 move the movable part 52 up with its elastic restoring force when the downward pressing force on the movable part 52 is released.

The movable part 52 is located above the accommodation part 21 and opposed to the receptacle 4 retained in the accommodation part 21 at a distance. When pressed down, the movable part 52 moves down to press the receptacle 4 retained in the accommodation part 21 down. When the downward pressing force is released, the movable part 52 moves up to release the downward pressure on the receptacle 4 retained in the accommodation part 21.

The rear wall part 53 is located at the rear end of the case 5, on the left and right of the movable part 52. The rear wall part 53 is recessed forward toward the movable part 52.

The hold-down 6 is an attachment member formed by punching out a metal plate by press-working and bending the punched metal plate and attached to the case 5 to fix the case 5 to the substrate 100. The hold-down 6 is inserted into the insertion part 25 of the case 5 and thereby attached to the case 5. The hold-down 6 includes a rear surface part 32, internal side surface parts 33, leg parts 34, a front surface part 35, a top surface part 61, and a window hole part 62.

The rear surface part 32 is formed by bending the metal plate down at the rear end of the top surface part 61. The rear surface part 32 covers the rear end of the movable part 52 and the rear wall part 53.

The internal side surface parts 33 are formed by bending the metal plate backward at the left and right ends of the front surface part 35, and located on the left and right of the top surface part 61. The internal side surface parts 33 are inserted into the insertion part 25.

The leg parts 34 project down from the insertion part 25 and are located above the bottom surface of the case 5. The front surface part 35 is formed by bending the metal plate down at the front end of the top surface part 61, and inserted into the insertion part 25.

The top surface part 61 covers the spring parts 51 and the upper end of the movable part 52.

The window hole part 62 is a penetration hole that is located substantially in the center of the top surface part 61 and penetrates the top surface part 61 in the thickness direction. The window hole part 62 exposes a part of the movable part 52 outside.

In the electrical connector 11 having the foregoing configuration, laterally outward elastic deformation of the engagement parts 22 is restricted by restriction parts 331 of the internal side surface parts 33. This can prevent the receptacle 4 from falling out of the accommodation part 21 before the electrical connector 11 is mounted on the substrate 100.

A method for manufacturing the electrical connector 11 according to the present embodiment is similar to the method for manufacturing the electrical connector 1. A description thereof will thus be omitted.

<Method for Mounting Electrical Connector>

A method for mounting the electrical connector 11 according to the second embodiment of the present invention will be described in detail below with reference to FIGS. 16 to 19.

The top surface of the movable part 52 of the case exposed outside from the window hole part 62 of the hold-down 6 of the electrical connector 11 is sucked to a suction nozzle 200 of a mounter, and the electrical connector 11 is transported to the mounting surface 100*a* of the substrate 100. Here, the locking claw parts 221 of the engagement parts 22 and the parts to be engaged 432 of the cover 43 are engaged with each other, whereby the terminal parts 422 of the receptacle 4 are located below the contact parts 23 of the case 5. The receptacle 4 is disposed opposite to the inner top wall part 29 and the movable part 52 of the case 5 at a distance.

Next, the leg parts 34 of the hold-down 6 of the electrical connector 11 are inserted into the through holes 100*b* of the substrate 100 from above.

As the leg parts 34 are inserted into the through holes 100*b*, the terminal parts 422 of the contacts 42 of the receptacle 4 and the projecting parts 412 of the shield case 41 initially make contact with the mounting surface 100*a*. The contact parts 23 of the case 5 then make contact with the mounting surface 100*a*.

Before the contact of the terminal parts 422 and the projecting part 412 with the mounting surface 100*a*, the vertical distance between the lower end parts of the contact parts 23 and the upper end parts of the locking claw parts 221 is smaller than the vertical distance between the lower end parts of the parts to be engaged 432 of the receptacle 4 and the soldering surfaces of the terminal parts 422. The soldering surfaces of the terminal parts 422 and the lower end parts of the projecting parts 412 are located below the lower end parts of the contact parts 23. When the terminal part 422 and the projecting parts 412 in such a state come into contact with the mounting surface 100*a*, the parts to be engaged 432 move up relative to the locking claw parts 221 and are thereby separated from the locking claw parts 221.

Moreover, the receptacle 4 moves up relative to the case 5 inside the accommodation part 21. This frees the receptacle 4 from the case 5.

Since the receptacle 4 moves up relative to the case 5, the terminal parts 422 of the receptacle 4 are vertically located at substantially the same position as the contact parts 23 of the case 5. The receptacle 4 that moves up relative to the case 5 is disposed opposite to the inner top wall part 29 and the movable part 52 of the case 5 closer than before the mounting on the mounting surface 100*a*.

Before the mounting of the electrical connector 11 on the substrate 100, the soldering surfaces of the terminal parts 422 of the receptacle 4 are located below the lower end parts of the contact parts 23 of the case 5. However, this is not restrictive, and the soldering surfaces of the terminal parts 422 and the lower end parts of the contact parts 23 may be vertically located at the same height. In such a case, the locking claw parts 221 and the parts to be engaged 432 may not be fully separated after the contact of the terminal parts 422 with the substrate 100. However, the receptacle 4 is similarly freed from the case 5 if the own weight of the receptacle 4 does not act on the locking claw parts 221 via the parts to be engaged 432.

Moreover, the restriction parts 331 of the hold-down 6 allow the laterally outward elastic deformation of the engagement parts 22 so far as the receptacle 4 does not fall out of the accommodation part 21. The positions of the terminal parts 422 can thus be laterally adjusted to the soldering positions on the mounting surface 100*a* for reliable contact.

Next, the movable part 52 of the case 5 is pressed down by the suction nozzle 200, whereby the spring parts 51 are elastically deformed to move down and press the receptacle 4 down. This presses the terminal parts 422 of the receptacle 4 against not-shown conductive parts of the mounting surface 100*a* of the substrate 100. The terminal parts 422 can thus be stably connected to the conductive parts.

Next, the terminal parts 422 and the projecting parts 412 of the receptacle 4 are soldered to the not-shown conductive parts of the mounting surface 100*a* of the substrate 100, and the leg parts 34 of the hold-down 6 are soldered to not-shown conductive parts of the through holes 100*b* of the substrate 100. The mounting of the electrical connector 11 on the substrate 100 is thereby completed. As described above, the receptacle 4 here is free from the case 5. The coplanarity of the terminal parts 422 with respect to the mounting surface 100*a* of the substrate 100 can thus be maintained in a favorable state without being affected by the case 5.

Figure 18:
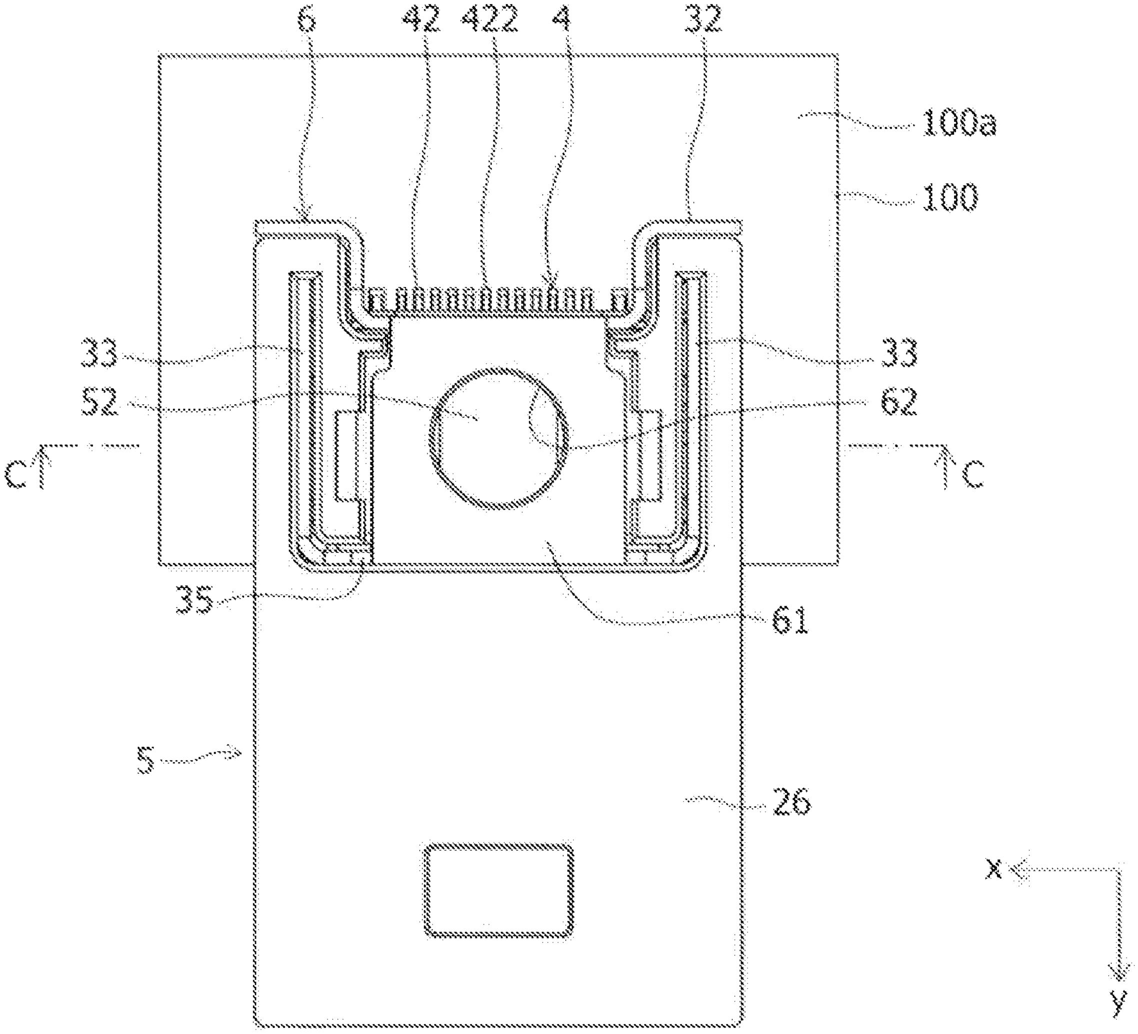
FIG. 18 is a plan view of the electrical connector including the hold-down according to the second embodiment of the present invention in a state where the electrical connector is mounted on a substrate.
Figure 19:
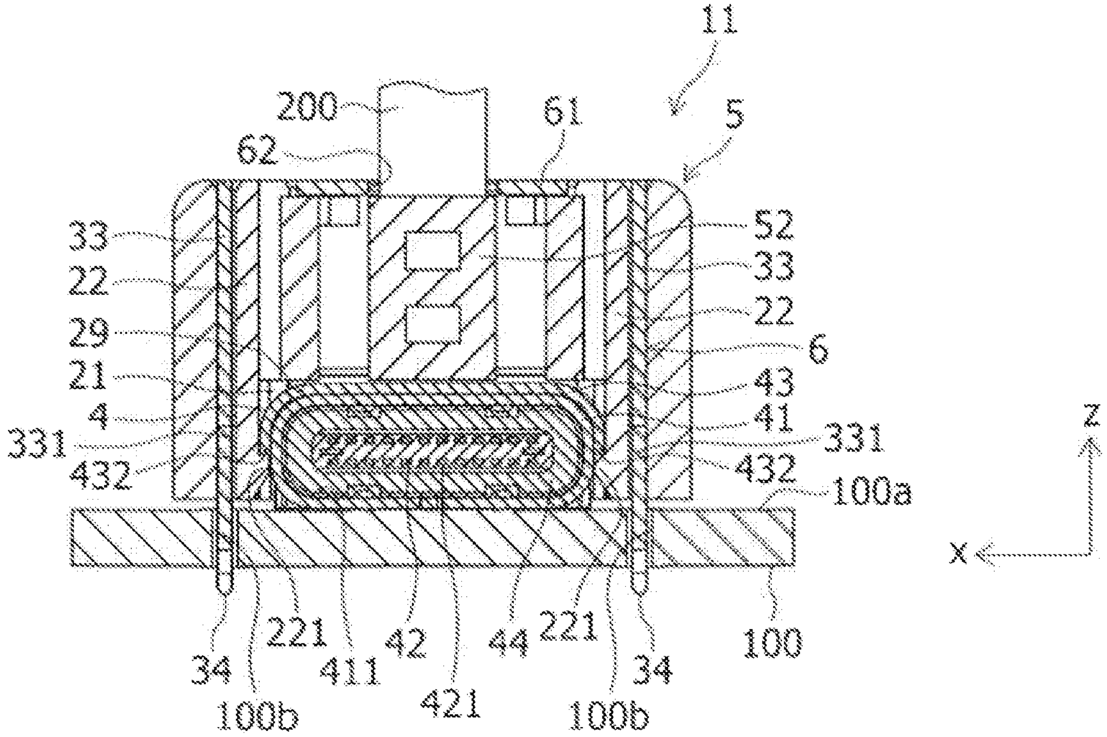
FIG. 19 is a cross-sectional view taken along line C-C of FIG. 18.

As shown in FIG. 18, the projecting part 26 of the case 5 of the electrical connector 11 mounted on the substrate 100 by the foregoing mounting method projects from the substrate 100. In such a state, the barycentric position of the electrical connector 11 overlaps the substrate 100 when seen from above (in the state shown in FIG. 18) because of the provision of the hold-down 6. The electrical connector 11 can thus be stably mounted on the substrate 100.

The restriction parts 331 are disposed above the leg parts 34 to be soldered to the conductive parts of the through holes 100*b*. The laterally outward elastic deformation of the engagement parts 22 can thus be reliably restricted by the restriction parts 331 in the state where the electrical connector 11 is mounted on the mounting surface 100*a* of the substrate 100.

As described above, according to the present embodiment, the case 5 includes the spring parts 51 and the movable part 52 that are located above the accommodation part 21 and can be elastically deformed to press down the receptacle 4 retained in the accommodation part 21 by the engagement parts 22. In addition to the effects of the foregoing first embodiment, the receptacle 4 can thus be stably mounted on the mounting surface 100*a* of the substrate 100.

In the present embodiment, in mounting the electrical connector 11 on the mounting surface 100*a*, the movable part 52 is pressed down by the suction nozzle 200. However, this is not restrictive, and the movable part 52 may be pressed down by a jig or the like other than the suction nozzle 200.

In the present embodiment, the hold-down 6 is configured without the external side surface parts 36. However, this is not restrictive, and the hold-down 6 may include the external side surface parts 36.

In the present embodiment, the elastic deformation of the engagement parts 22 in the direction of causing the receptacle 4 to fall out of the accommodation part 21 is restricted by the hold-down 6. However, this is not restrictive. An attachment member other than the hold-down 6 may be attached to the case 5, and the elastic deformation of the engagement parts 22 in the direction of causing the receptacle 4 to fall out of the accommodation part 21 may be restricted by the attachment member.

Third Embodiment

<Configuration of Electrical Connector>

A configuration of an electrical connector 12 according to a third embodiment of the present invention will be described in detail below with reference to FIGS. 20 to 22.

Figure 20:
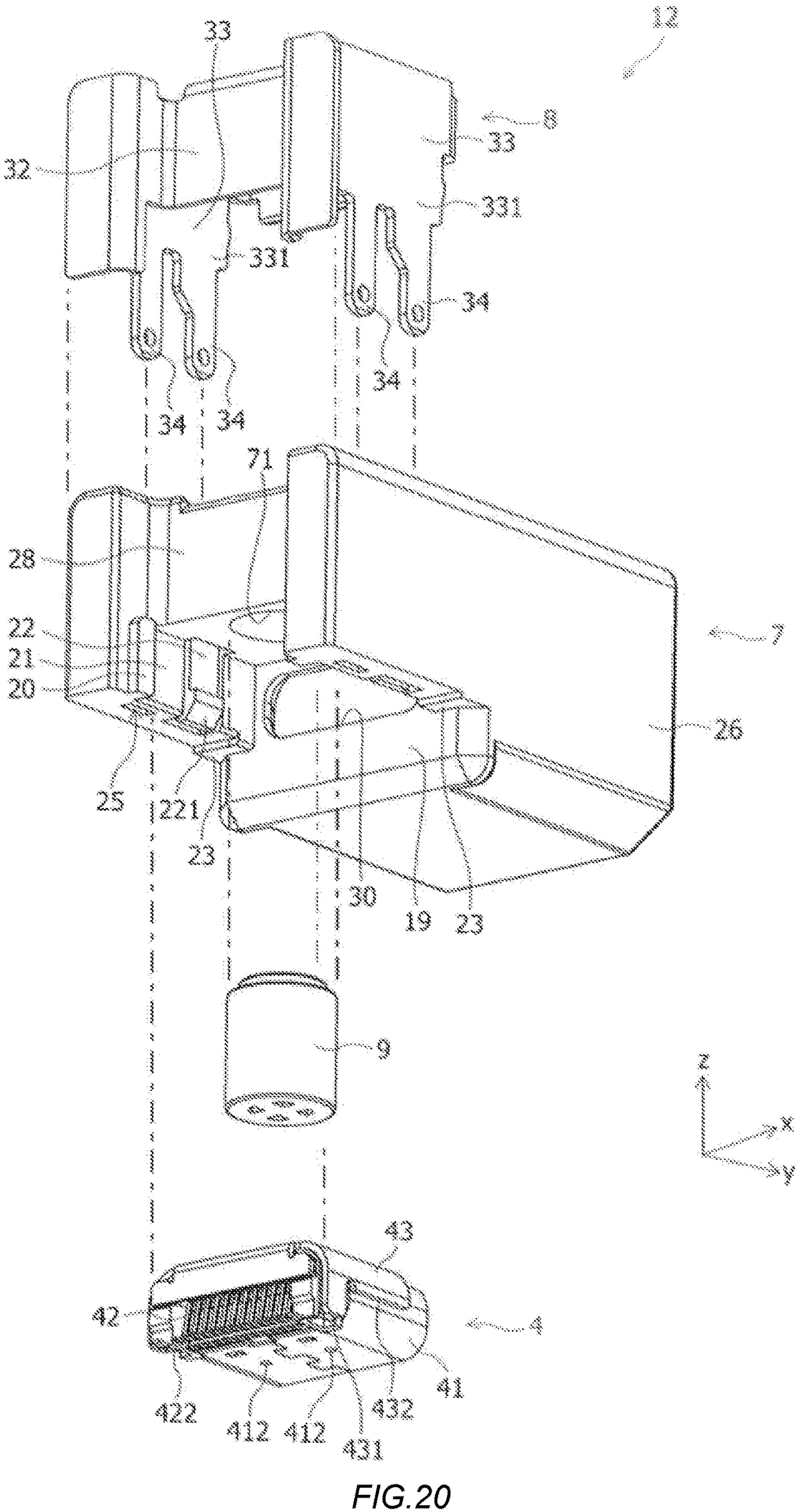
FIG. 20 is an exploded perspective view of an electrical connector according to a third embodiment of the present invention.
Figure 21:
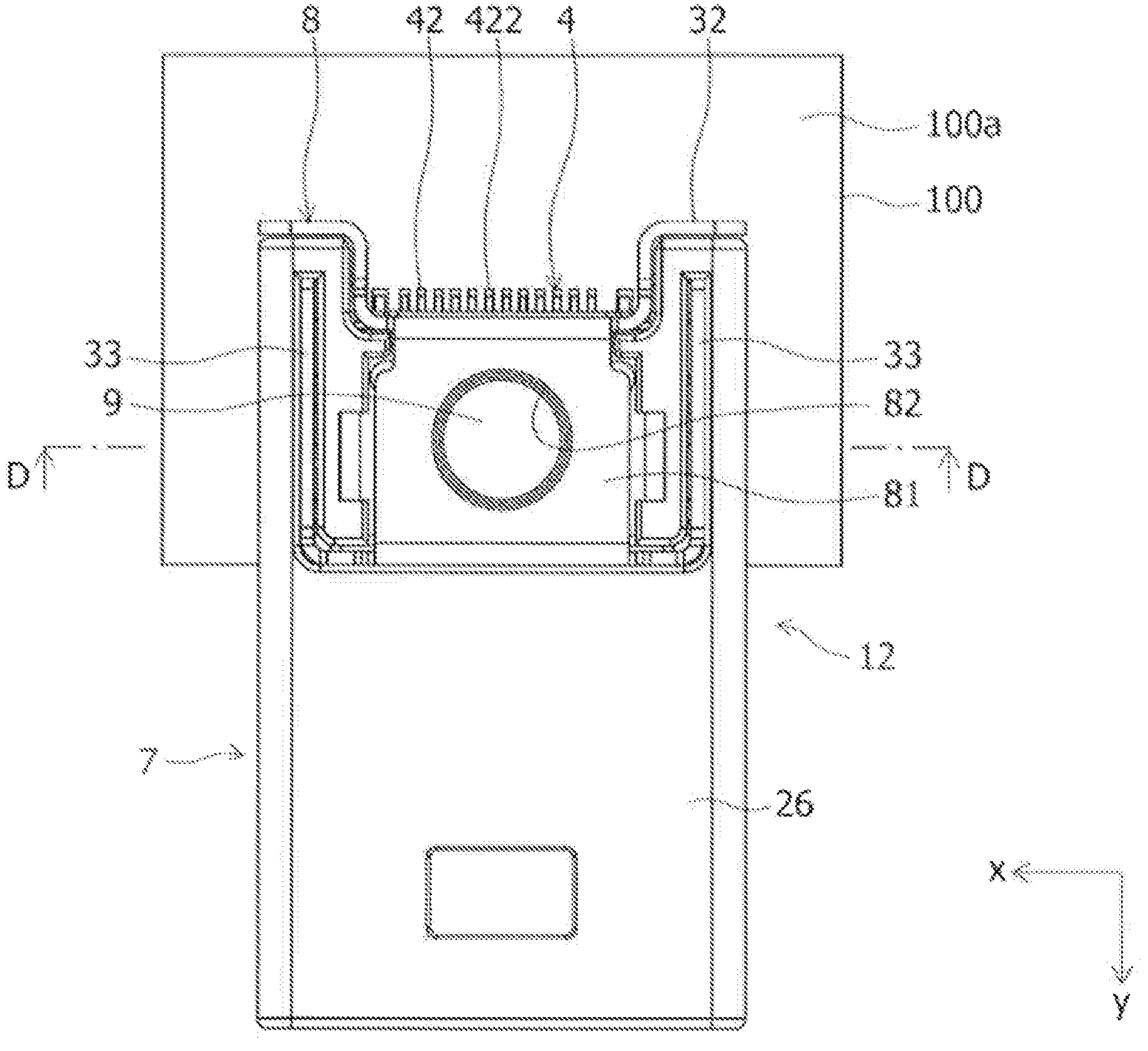
FIG. 21 is a plan view of the electrical connector including a hold-down according to the third embodiment of the present invention in a state where the electrical connector is mounted on a substrate.
Figure 22:
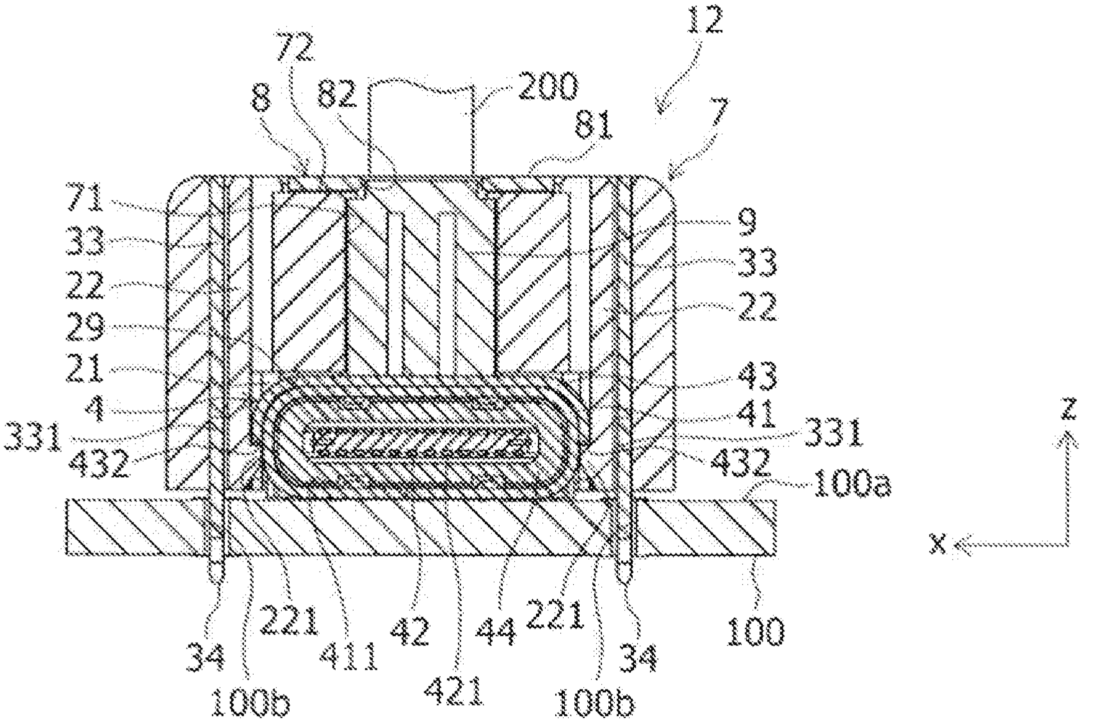
FIG. 22 is a cross-sectional view taken along line D-D of FIG. 21.

In FIGS. 20 to 22, portions having the same configurations as in FIGS. 1 to 15 are denoted by the same reference numerals. A description thereof will be omitted.

The electrical connector 12 according to the present embodiment includes a receptacle 4, a case 7, a hold-down 8, and a slider 9.

The case 7 is made of an insulating material such as a resin. The case 7 includes a front wall part 19, projecting wall parts 20, an accommodation part 21, engagement parts 22, contact parts 23, a mating part 24, an insertion part 25, a projecting part 26, a rear wall part 28, an inner top wall part 29, an opening 30, a communication hole 71, and a flat part 72.

The accommodation part 21 is a recess formed in the lower surface or bottom surface of the case 7. The accommodation part 21 communicates with outside at the rear end.

The contact parts 23 make contact with a mounting surface 100*a* of a substrate 100 when the case 7 is mounted on the mounting surface 100*a*.

The insertion part 25 is a penetration hole vertically penetrating the case 7 around the accommodation part 21. The hold-down 8 is inserted into the insertion part 25.

The projecting part 26 projects forward from the substrate 100 when the case 7 is mounted on the mounting surface 100*a* of the substrate 100 (see FIG. 18).

The rear wall part 28 is located at the rear end of the case 7. The rear wall part 28 is recessed forward in the lateral center.

The inner top wall part 29 is located above the accommodation part 21. The inner top wall part 29 is disposed opposite to the receptacle 4 retained in the accommodation part 21 at a distance.

The communication hole 71 is extended upward from the accommodation part 21 and open to outside at the upper end. The slider 9 is vertically movably retained in the communication hole 71.

The flat part 72 is disposed at the rear upper surface of the case 7 around the communication hole 71. The flat part 72 is flat along the front-to-back and left-to-right directions.

The hold-down 8 is an attachment member formed by punching out a metal plate by press-working and bending the punched metal plate and attached to the case 7 to fix the case 7 to the substrate 100. The hold-down 8 is inserted into the insertion part 25 of the case 7 and thereby attached to the case 7. The hold-down 8 includes a rear surface part 32, internal side surface parts 33, leg parts 34, a front surface part 35, a top surface part 81, and a window hole part 82.

The rear surface part 32 is formed by bending the metal plate down at the rear end of the top surface part 81. The rear surface part 32 covers the rear wall part 28.

The internal side surface parts 33 are formed by bending the metal plate backward at the left and right ends of the front surface part 35, and located on the left and right of the top surface part 81. The internal side surface parts 33 are inserted into the insertion part 25.

The leg parts 34 project down from the insertion part 25, and are located above the bottom surface of the case 7.

The front surface part 35 is formed by bending the metal plate down at the front end of the top surface part 81. The front surface part 35 is inserted into the insertion part 25.

The top surface part 81 covers the flat part 72.

The window hole part 82 is a penetration hole that is located substantially in the center of the top surface part 81 and penetrates the top surface part 81 in the thickness direction. The window hole part 82 exposes the upper end of the slider 9 retained in the communication hole 71 outside.

The slider 9 is cylindrical in shape and vertically movably retained in the communication hole 71. The slider 9 can press the receptacle 4 down by moving down.

<Method for Manufacturing Electrical Connector>

Figure 16:
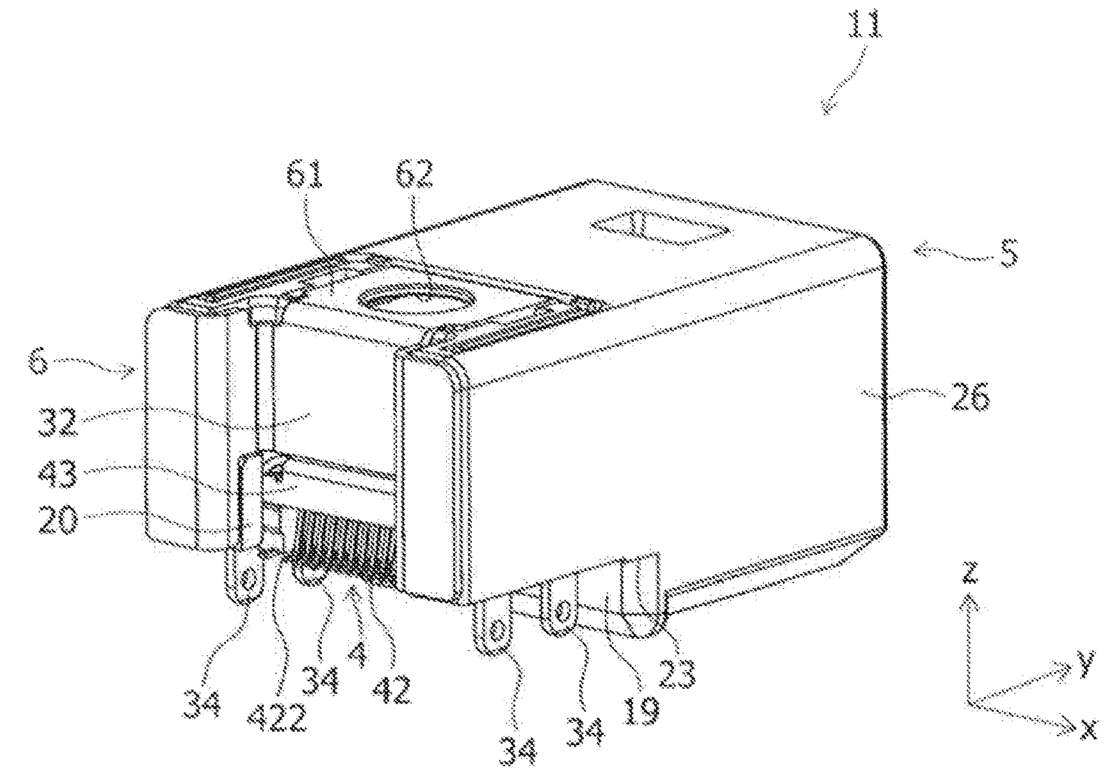
FIG. 16 is a perspective view of an electrical connector according to a second embodiment of the present invention.
Figure 17:
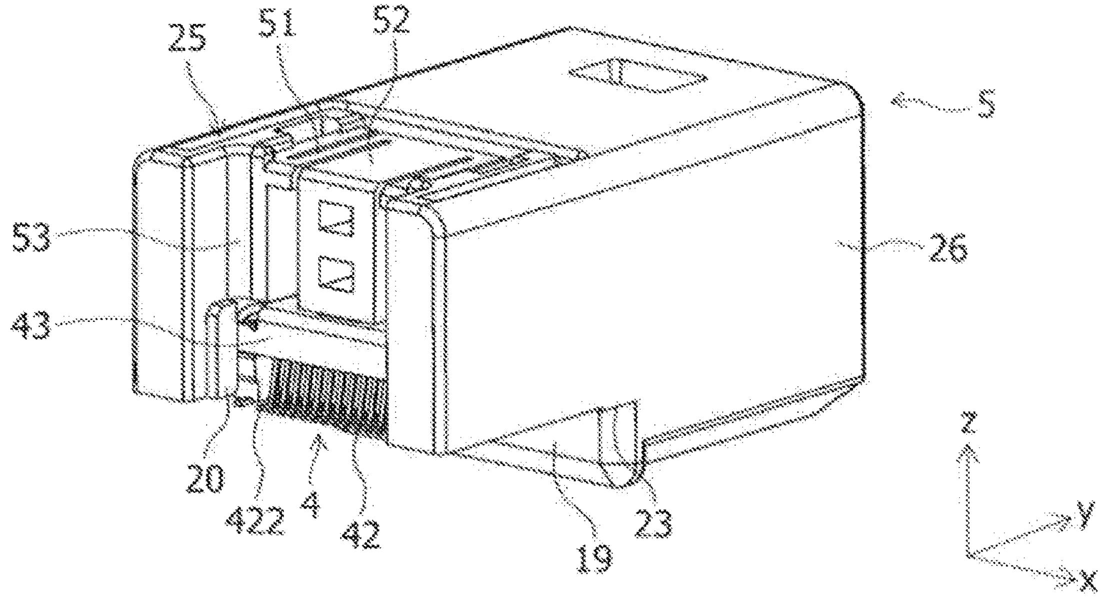
FIG. 17 is a perspective view of the electrical connector according to the second embodiment of the present invention with a hold-down removed.

A method for manufacturing the electrical connector 12 according to the third embodiment of the present invention will be described in detail below with reference to FIGS. 16 to 18.

Initially, the case 7 is formed by injection molding or the like using a resin material in advance, and the hold-down 8 is formed by press-working a metal plate. Moreover, the receptacle 4 manufactured by an existing method is prepared.

Next, an insertion step of inserting the slider 9 into the communication hole 71 of the case 7 from below and then inserting the receptacle 4 into the accommodation part 21 of the case 7 from in front of and below the projecting wall parts 20 is performed. Here, the receptacle 4 is inserted into the accommodation part 21 while elastically deforming the engagement parts 22 of the case 7 outward by the cover 43 of the receptacle 4. The rest of the manufacturing method is similar to that of the method for manufacturing the electrical connector 1. A description thereof will thus be omitted.

With the electrical connector 12 completed, the laterally outward elastic deformation of the engagement parts 22 is restricted by the restriction parts 331 of the internal side surface parts 33. This can prevent the receptacle 4 from falling out of the accommodation part 21 before the electrical connector 12 is mounted on the substrate 100.

<Method for Mounting Electrical Connector>

A method for mounting the electrical connector 12 according to the third embodiment of the present invention will be described in detail below with reference to FIGS. 16 to 18.

The slider 9 exposed outside from the window hole part 82 of the hold-down 8 of the electrical connector 12 manufactured by the foregoing manufacturing method is sucked to a suction nozzle 200 of a mounter, and the electrical connector 12 is transported to the mounting surface 100*a* of the substrate 100. Here, the locking claw parts 221 of the engagement parts 22 and the parts to be engaged 432 of the cover 43 are engaged with each other, whereby the terminal parts 422 of the receptacle 4 are located below the contact parts 23 of the case 7. The receptacle 4 is disposed opposite to the inner top wall part 29 of the case 7 at a distance.

Next, the leg parts 34 of the hold-down 8 of the electrical connector 12 are inserted into the through holes 100*b* of the substrate 100 from above.

As the leg parts 34 are inserted into the through holes 100*b*, the terminal parts 422 of the contacts 42 of the receptacle 4 and the projecting parts 412 of the shield case 41 initially make contact with the mounting surface 100*a*. The contact parts 23 of the case 7 then make contact with the mounting surface 100*a*.

Before the contact of the terminal parts 422 and the projecting parts 412 with the mounting surface 100*a*, the vertical distance between the lower end parts of the contact parts 23 and the upper end parts of the locking claw parts 221 is smaller than the vertical distance between the lower end parts of the parts to be engaged 432 of the receptacle 4 and the soldering surfaces of the terminal parts 422. The soldering surfaces of the terminal parts 422 and the lower end parts of the projecting parts 412 are located below the lower end parts of the contact parts 23. When the terminal parts 422 and the projecting parts 412 in such a state come into contact with the mounting surface 100*a*, the parts to be engaged 432 move up relative to the locking claw parts 221 and are thereby separated from the locking claw parts 221. Moreover, the receptacle 4 moves up relative to the case 7 inside the accommodation part 21. This frees the receptacle 4 from the case 7.

Since the receptacle 4 moves up relative to the case 7, the terminal parts 422 of the receptacle 4 are vertically located at substantially the same position as the contact parts 23 of the case 7. The receptacle 4 that moves up relative to the case 7 is disposed opposite to the inner top wall part 29 of the case 7 closer than before the mounting on the mounting surface 100*a*, and pushes up the slider 9.

Before the mounting of the electrical connector 12 on the substrate 100, the soldering surfaces of the terminal parts 422 of the receptacle 4 are located below the lower end parts of the contact parts 23 of the case 7. However, this is not restrictive, and the soldering surfaces of the terminal parts 422 and the lower end parts of the contact parts 23 may be vertically located at the same height. In such a case, the locking claw parts 221 and the parts to be engaged 432 may not be fully separated after the contact of the terminal parts 422 with the substrate 100. However, the receptacle 4 is similarly freed from the case 7 if the own weight of the receptacle 4 does not act on the locking claw parts 221 via the parts to be engaged 432.

Moreover, the restriction parts 331 of the hold-down 8 allow the laterally outward elastic deformation of the engagement parts 22 so far as the receptacle 4 does not fall out of the accommodation part 21. The positions of the terminal parts 422 can thus be laterally adjusted to the soldering positions on the mounting surface 100*a* for reliable contact.

Next, the slider 9 is pressed down by the suction nozzle 200 to move down inside the communication hole 71, and presses the receptacle 4 down. The terminal parts 422 of the receptacle 4 are thereby pressed against not-shown conductive parts of the mounting surface 100*a* of the substrate 100, and can thus be stably connected to the conductive parts.

Next, the terminal parts 422 and the projecting parts 412 of the receptacle 4 are soldered to the not-shown conductive parts of the mounting surface 100*a* of the substrate 100, and the leg parts 34 of the hold-down 8 are soldered to not-shown conductive parts of the through holes 100*b* of the substrate 100. The mounting of the electrical connector 12 on the substrate 100 is thereby completed. As described above, since the receptacle 4 here is free from the case 7, the coplanarity of the terminal parts 422 with respect to the mounting surface 100*a* of the substrate 100 can be maintained in a favorable state without being affected by the case 7.

As shown in FIG. 21, the projecting part 26 of the case 7 of the electrical connector 12 mounted on the substrate 100 by the foregoing mounting method projects from the substrate 100. In such a state, the barycentric position of the electrical connector 12 overlaps the substrate 100 when seen from above (in the state shown in FIG. 21) because of the provision of the hold-down 8. The electrical connector 12 can thus be stably mounted on the substrate 100.

Moreover, since the restriction parts 331 are disposed above the leg parts 34 to be soldered to the conductive parts of the through holes 100*b*, the laterally outward elastic deformation of the engagement parts 22 can be reliably restricted by the restriction parts 331 in the state where the electrical connector 12 is mounted on the mounting surface 100*a* of the substrate 100.

As described above, according to the present embodiment, the case 7 includes the communication hole 71 that is extended upward from the accommodation part 21 and open to outside at the upper end, and in which the slider 9 is vertically movably retained. The slider 9 can move down in the communication hole 71 to press down the receptacle 4 retained in the accommodation part 21 by the engagement parts 22. In addition to the effect of the foregoing first embodiment, the receptacle 4 can thus be stably mounted on the mounting surface 100*a* of the substrate 100.

In the present embodiment, the slider 9 is pressed down by the suction nozzle 200 in mounting the electrical connector 12 on the mounting surface 100*a*. However, this is not restrictive, and the slider 9 may be pressed down by a jig or the like other than the suction nozzle 200.

In the present embodiment, the elastic deformation of the engagement parts 22 in the direction of causing the receptacle 4 to fall out of the accommodation part 21 is restricted by the hold-down 8. However, this is not restrictive. An attachment member other than the hold-down 8 may be attached to the case 7, and the elastic deformation of the engagement parts 22 in the direction of causing the receptacle 4 to fall out of the accommodation part 21 may be restricted by the attachment member.

It will be understood that the present invention is not limited to the foregoing embodiments in the types, layout, and numbers of members etc., and appropriate modifications can be made with departing from the gist of the invention, like replacing the components with ones having equivalent operation and effects as appropriate.

Specifically, in the foregoing first to third embodiments, the receptacle 4 is retained in the accommodation part 21. However, this is not restrictive, and a connector having a different configuration from that of the receptacle 4 may be retained in the accommodation part 21.

In the foregoing first to third embodiments, the receptacle 4 retained in the accommodation part 21 can move up and to the left and right. However, this is not restrictive. The receptacle 4 retained in the accommodation part 21 may be movable to the front and back in addition to up and to the left and right. In such a case, the receptacle 4 retained in the accommodation part 21 can be self-aligned inside the case 2, 5, or 7.

In the foregoing first to third embodiments, the restriction parts 311 are disposed above the leg parts 34. However, this is not restrictive. The restriction parts 311 may be located near the leg parts 34 other than above the leg parts 34, like between a pair of leg parts 34. Even in such a case, the laterally outward elastic deformation of the engagement parts 22 can be reliably restricted by the restriction parts 331.

INDUSTRIAL APPLICABILITY

The present invention is suitable for an electrical connector that includes a case configured to be mounted on a mounting surface of a substrate, and a receptacle.

REFERENCE SIGNS LIST

1 Electrical connector
2 Case
3 Hold-down
4 Receptacle
5 Case
6 Hold-down
7 Case
8 Hold-down
9 Slider
11 Electrical connector
12 Electrical connector
18 Pressing part
19 Front wall part
20 Projecting wall part
21 Accommodation part
22 Engagement part
23 Contact part
24 Mating part
25 Insertion part
26 Projecting part
27 Flat part
28 Rear wall part
29 Inner top wall part
30 Opening
31 Top surface part
32 Rear surface part
33 Internal side surface part
34 Leg part
35 Front surface part
36 External side surface part
41 Shield case
42 Contact
43 Cover
44 Housing
51 Spring part
52 Movable part
53 Rear wall part
61 Top surface part
62 Window hole part
71 Communication hole
72 Flat part
81 Top surface part
82 Window hole part
100 Substrate
100*a* Mounting surface
100*b* Through hole
200 Suction nozzle
221 Locking claw part
331 Restriction part
411 Mating part
412 Projecting part
421 Connection part
422 Terminal part
431 Leg part
432 Part to be engaged

The invention claimed is:

1. An electrical connector comprising:
a case configured to be mounted on a mounting surface of a substrate;
a receptacle configured to be mounted on the mounting surface as accommodated in the case; and
an attachment member configured to be attached to the case, wherein
the case includes an accommodation part configured to accommodate the receptacle, and a retaining part configured to retain the receptacle in the accommodation part,
the retaining part includes an elastically deformable elastic part configured to retain the receptacle in the accommodation part with an elastic force, and
the attachment member includes a restriction part configured to restrict elastic deformation of the elastic part in a direction of causing the receptacle to fall out of the accommodation part.

2. The electrical connector according to claim 1, wherein the attachment member is a hold-down configured to fix the case to the substrate.

3. The electrical connector according to claim 1, wherein:
the attachment member includes a soldering part configured to be soldered to the substrate; and
the restriction part is located near the soldering part.

4. The electrical connector according to claim 1, wherein:
the case includes a contact part configured to make contact with the mounting surface; and
the receptacle includes a terminal part to be soldered to the mounting surface, and in a state where the receptacle is retained in the accommodation part, the terminal part is located at the same height as the contact part or below the contact part, and can move up.

5. The electrical connector according to claim 2, wherein:
the attachment member includes a soldering part configured to be soldered to the substrate; and
the restriction part is located near the soldering part.

6. The electrical connector according to claim 2, wherein:
the case includes a contact part configured to make contact with the mounting surface; and
the receptacle includes a terminal part to be soldered to the mounting surface, and in a state where the receptacle is retained in the accommodation part, the terminal part is located at the same height as the contact part or below the contact part, and can move up.

7. The electrical connector according to claim 3, wherein:
the case includes a contact part configured to make contact with the mounting surface; and
the receptacle includes a terminal part to be soldered to the mounting surface, and in a state where the receptacle is retained in the accommodation part, the terminal part is located at the same height as the contact part or below the contact part, and can move up.

8. The electrical connector according to claim 5, wherein:
the case includes a contact part configured to make contact with the mounting surface; and
the receptacle includes a terminal part to be soldered to the mounting surface, and in a state where the receptacle is retained in the accommodation part, the terminal part is located at the same height as the contact part or below the contact part, and can move up.

9. A method for manufacturing an electrical connector, the electrical connector including a case configured to be mounted on a mounting surface of a substrate, a receptacle configured to be mounted on the mounting surface as accommodated in the case, and an attachment member, the method comprising:

a retaining step of accommodating the receptacle into the accommodation part of the case and retaining the receptacle accommodated in the accommodation part with a retaining part of the case; and an attachment step of attaching the attachment member to the case, wherein the retaining step includes accommodating the receptacle into the accommodation part while elastically deforming an elastic part of the retaining part, and retaining the receptacle in the accommodation part with an elastic force of the elastic part; and restricting elastic deformation of the elastic part in a direction of causing the receptacle to fall out of the accommodation part by a restriction part of the attachment member attached to the case in the attachment step.

10. The method for manufacturing the electrical connector according to claim 9, wherein the attachment member is a hold-down configured to fix the case to the substrate.

11. The method for manufacturing the electrical connector according to claim 9, wherein:

the attachment member includes a soldering part configured to be soldered to the substrate; and the restriction part is located near the soldering part.

12. The method for manufacturing the electrical connector according to claim 9, wherein:

the case includes a contact part configured to make contact with the mounting surface; and the receptacle includes a terminal part to be soldered to the mounting surface, and in a state where the receptacle is retained in the accommodation part, the terminal part is located at the same height as the contact part or below the contact part, and can move up.

13. The method for manufacturing the electrical connector according to claim 10, wherein:

the attachment member includes a soldering part configured to be soldered to the substrate; and the restriction part is located near the soldering part.

14. The method for manufacturing the electrical connector according to claim 10, wherein:

the case includes a contact part configured to make contact with the mounting surface; and the receptacle includes a terminal part to be soldered to the mounting surface, and in a state where the receptacle is retained in the accommodation part, the terminal part is located at the same height as the contact part or below the contact part, and can move up.

15. The method for manufacturing the electrical connector according to claim 11, wherein:

the case includes a contact part configured to make contact with the mounting surface; and the receptacle includes a terminal part to be soldered to the mounting surface, and in a state where the receptacle is retained in the accommodation part, the terminal part is located at the same height as the contact part or below the contact part, and can move up.

16. The method for manufacturing the electrical connector according to claim 13, wherein:

the case includes a contact part configured to make contact with the mounting surface; and the receptacle includes a terminal part to be soldered to the mounting surface, and in a state where the receptacle is retained in the accommodation part, the terminal part is located at the same height as the contact part or below the contact part, and can move up.

* * * * *